United States Patent
Zou

(10) Patent No.: US 12,553,966 B2
(45) Date of Patent: Feb. 17, 2026

(54) FAST T2-WEIGHTED AND DIFFUSION-WEIGHTED CHIRPED-CPMG SEQUENCES

(71) Applicant: neuro42 Inc., San Francisco, CA (US)

(72) Inventor: Xiaowei Zou, San Francisco, CA (US)

(73) Assignee: neuro42, Inc., San Francisco, CA (US)

( * ) Notice: Subject to any disclaimer, the term of this patent is extended or adjusted under 35 U.S.C. 154(b) by 144 days.

(21) Appl. No.: 18/153,175

(22) Filed: Jan. 11, 2023

(65) Prior Publication Data

US 2024/0230804 A1 Jul. 11, 2024

(51) Int. Cl.
*G01R 33/36* (2006.01)
*G01R 33/56* (2006.01)

(52) U.S. Cl.
CPC ..... *G01R 33/3607* (2013.01); *G01R 33/5602* (2013.01)

(58) Field of Classification Search
CPC .............. G01R 33/3607; G01R 33/5602
See application file for complete search history.

(56) References Cited

U.S. PATENT DOCUMENTS

| | | | | |
|---|---|---|---|---|
| 5,126,671 | A * | 6/1992 | Bodenhausen .... | G01R 33/4616 324/309 |
| 10,338,177 | B2 * | 7/2019 | Kuhara ................ | G01R 33/543 |
| 12,270,867 | B2 | 4/2025 | Inglis et al. | |
| 12,332,333 | B2 | 6/2025 | Peng | |
| 12,360,193 | B2 | 7/2025 | Lin et al. | |
| 2024/0168105 | A1 | 5/2024 | Inglis et al. | |
| 2024/0215849 | A1 | 7/2024 | Lin et al. | |
| 2024/0215927 | A1 | 7/2024 | Lin | |

(Continued)

FOREIGN PATENT DOCUMENTS

| | | |
|---|---|---|
| WO | WO-2022236308 A1 | 11/2022 |
| WO | WO-2024151723 A1 | 7/2024 |

OTHER PUBLICATIONS

Melhem, E. R., Itoh, R., & Folkers, P. J. (2001). Cervical spine: Three-dimensional fast spin-echo MR imaging—improved recovery of longitudinal magnetization with driven equilibrium pulse. Radiology, 218(1), 283-288. https://doi.org/10.1148/radiology.218.1.r01ja38283 (Year: 2001).*

(Continued)

*Primary Examiner* — Gregory H Curran
(74) *Attorney, Agent, or Firm* — Wilson Sonsini Goodrich & Rosati

(57) ABSTRACT

Various systems and methods for T2-weighted and/or diffusion weighted chirped-CPMG sequences are disclosed herein. In one aspect, a method can include projecting a magnetic field along a longitudinal axis and toward an object of interest and transmitting a radio frequency pulse sequence to a radio frequency coil assembly configured to selectively excite magnetization in the object of interest. The radio frequency pulse sequence can include a frequency-swept excitation pulse and a series of frequency-swept refocusing pulses following the excitation pulse. In some aspects, the radio frequency pulse sequence can include a frequency-swept recovery pulse following the series of refocusing pulses. In some aspects, the method can include transmitting a preparation radio frequency pulse sequence to the radio frequency coil assembly.

18 Claims, 11 Drawing Sheets

(56) References Cited

U.S. PATENT DOCUMENTS

2024/0219504 A1     7/2024    Lin et al.
2024/0230811 A1     7/2024    Peng

OTHER PUBLICATIONS

Casabianca et al., Chirped CPMG for well-logging NMR applications, Journal of Magnetic Resonance (Mar. 12, 2014), 242:197-202.

Bhattacharyya et al., Quadrupolar nuclear magnetic resonance spectroscopy in solids using frequency-swept echoing pulses, J. Chem. Phys. (Nov. 16, 2007) 127:194503-1-194503-8.

Cooley, Clarissa Zimmerman et al. Design of Sparse Halbach Magnet Arrays for Portable MRI Using a Genetic Algorithm. IEEE Transactions on Magnetics 54(1):5100112, 1-12 (2018). Published online Oct. 23, 2017.

Hu, Houchun H. et al. Comparison of 2D Blade Turbo Gradient- and Spin-Echo and 2D Spin-Echo Echo-Planar Diffusion-Weighted Brain MRI at 3 T: Preliminary Experience in Children. Academic Radiology 26(12):1597-1604 (2019).

IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications. IEEE Standard 802.3:1-2977 (2008).

PCT/US2024/011035 International Search Report and Written Opinion dated Apr. 23, 2024.

Schlaeger, Sarah et al. Water T2 Mapping in Fatty Infiltrated Thigh Muscles of Patients With Neuromuscular Diseases Using a T2-Prepared 3D Turbo Spin Echo With SPAIR. Journal of Magnetic Resonance Imaging 51(6):1727-1736 (2020). Published online Dec. 24, 2019.

The ATM Forum Technical Committee. ATM-MPLS Network Interworking Version 2.0, Aug. 2003; [retrieved on Aug. 20, 2024]. Available at URL:https://www.broadband-forum.org/download/af-aic-0178.001.pdf pp. 1-34.

\* cited by examiner

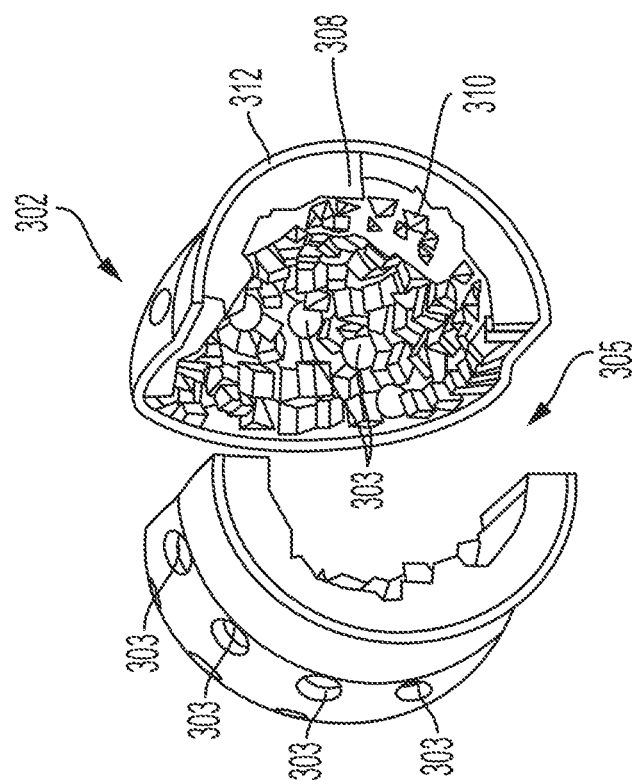
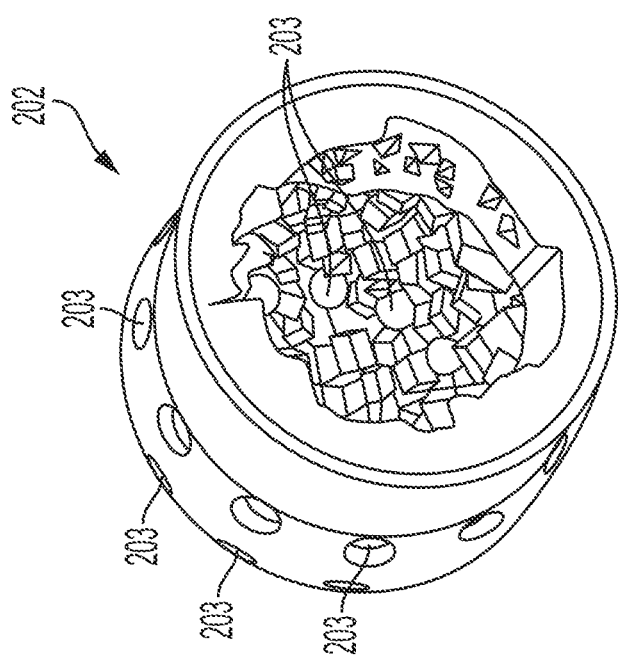
FIG. 3
FIG. 2

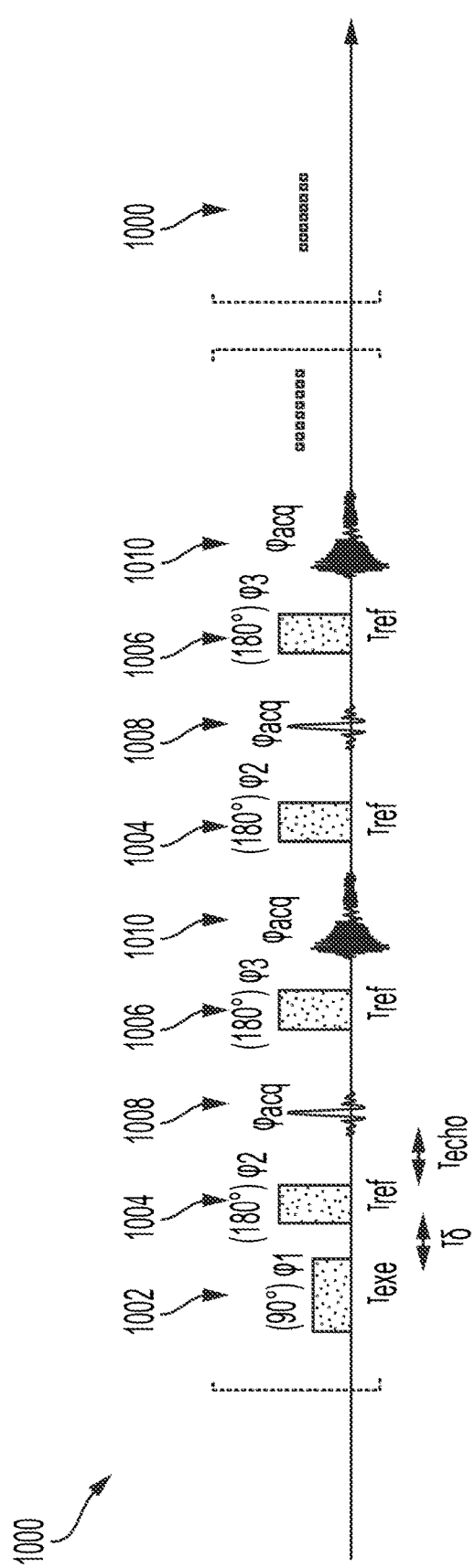
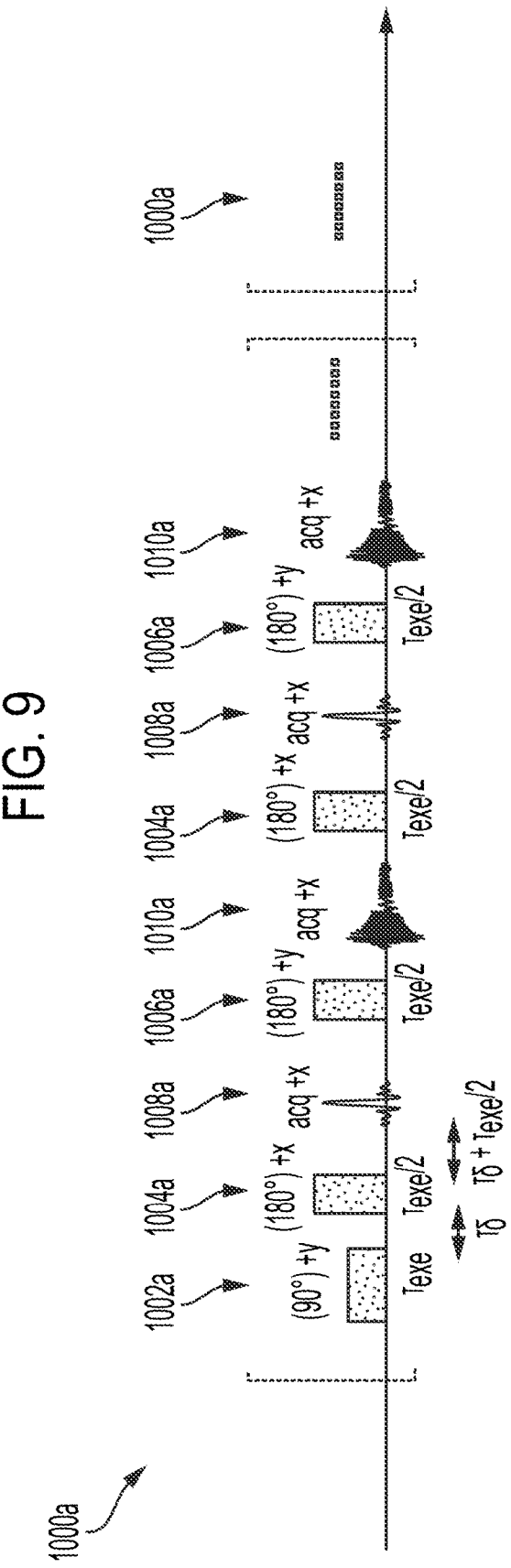
FIG. 9
FIG. 9A

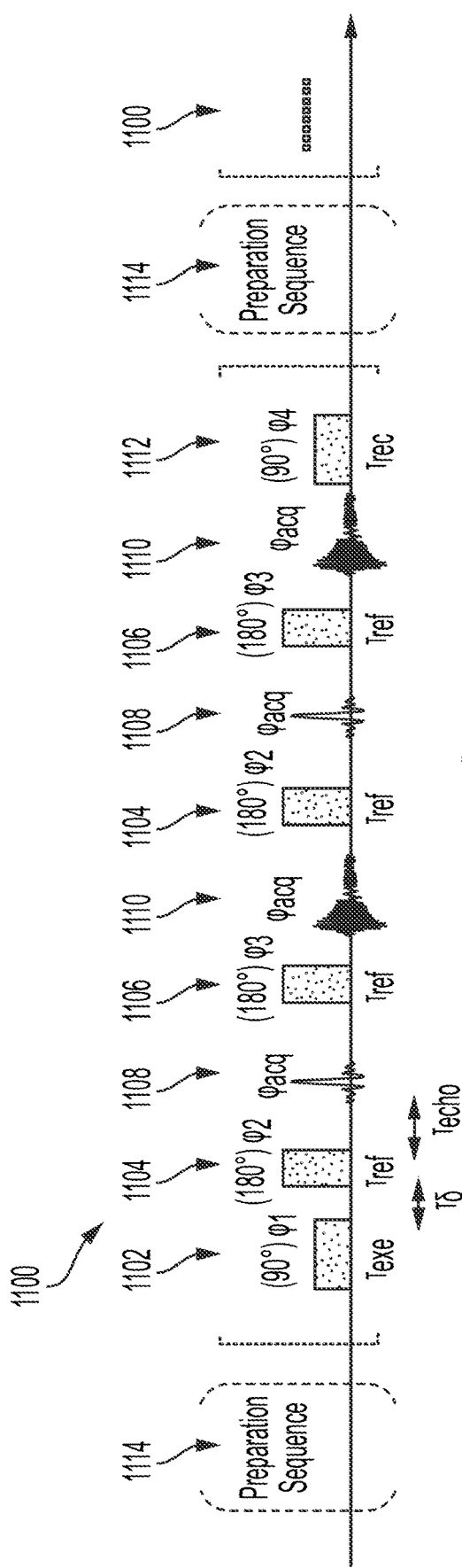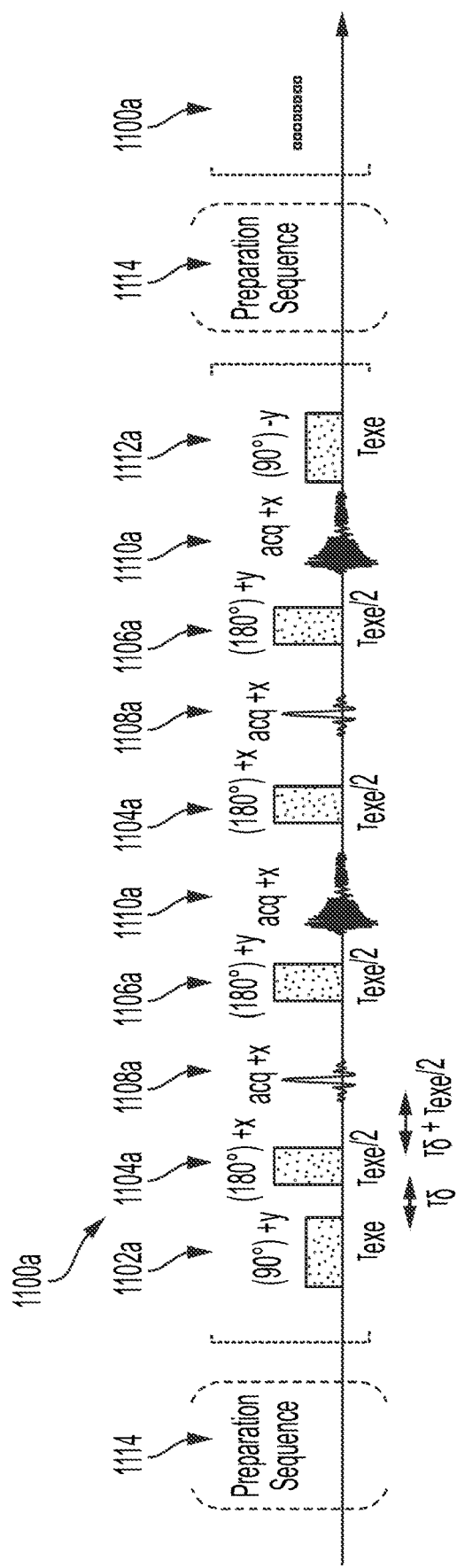
FIG. 10
FIG. 10A

FAST T2-WEIGHTED AND DIFFUSION-WEIGHTED CHIRPED-CPMG SEQUENCES

BACKGROUND

The present disclosure relates to magnetic resonance imaging (MRI), medical imaging, medical intervention, and surgical intervention. MRI systems often include large and complex machines that generate significantly high magnetic fields and create significant constraints on the feasibility of certain surgical interventions. Restrictions can include limited physical access to the patient by a surgeon and/or a surgical robot and/or limitations on the usage of certain electrical and mechanical components in the vicinity of the MRI scanner. Such limitations are inherent in the underlying design of many existing systems and are difficult to overcome.

SUMMARY

According to one aspect of the present disclosure, a method is disclosed. The method can include projecting a magnetic field along a longitudinal axis and toward an object of interest located within a field of view and transmitting a radio frequency pulse sequence to a radio frequency coil assembly configured to selectively excite magnetization in the object of interest within the field of view. The radio frequency pulse sequence can include an excitation pulse, a series of refocusing pulses following the excitation pulse, and a recovery pulse following the series of refocusing pulses. The excitation pulse can be frequency swept across a frequency offset range. Each of the refocusing pulses can be frequency swept across the frequency offset range. Each of the refocusing pulses can be half the duration of the excitation pulse. The recovery pulse can be frequency swept across the frequency offset range. The method can further include receiving an output signal detected by the radio frequency coil assembly intermediate two of the refocusing pulses.

According to another aspect of the present disclosure, a system is disclosed. The system can include an array of magnets, a radio frequency coil assembly, and a control circuit. The array of magnets can be configured to generate a low-field strength magnetic field toward an object of interest located within a field of view. The radio frequency coil assembly can be configured to selectively excite magnetization in the object of interest in the field of view. The control circuit can include a processor and a memory. The memory can store instructions executable by the processor to transmit a preparation radio frequency pulse sequence to the radio frequency coil assembly and transmit a primary radio frequency pulse sequence to the radio frequency coil assembly. The primary radio frequency pulse sequence can include an excitation pulse and a series of refocusing pulses following the excitation pulse. The excitation pulse can be frequency swept across a frequency offset range at a first rate. The excitation pulse is a 90° pulse. Each of the refocusing pulses can be frequency swept across the frequency offset range at a second rate that is twice the first rate. Each of the refocusing pulses are 180° pulses and can be half the duration of the excitation pulse. The memory can further store instructions executable by the processor to receive an output signal detected by the radio frequency coil assembly intermediate two of the refocusing pulses.

BRIEF DESCRIPTION OF THE DRAWINGS

The various aspects described herein, both as to organization and methods of operation, together with further objects and advantages thereof, may best be understood by reference to the following description, taken in conjunction with the accompanying drawings as follows.

FIG. 2 is a perspective view of an alternative dome-shaped housing for a magnetic array for use with the MRI scanning system of FIG. 1, wherein access apertures are defined in the dome-shaped housing, in accordance with at least one aspect of the present disclosure.

FIG. 3 is a perspective view of an alternative dome-shaped housing for a magnetic array for use with the MRI scanning system of FIG. 1, wherein access apertures and an adjustable gap is defined in the dome-shaped housing, in accordance with at least one aspect of the present disclosure.

FIG. 9 depicts is a pulse sequence diagram illustrating a chirped-Carr-Purcell Meiboom-Gill (CPMG) sequence, in accordance with various aspects of the present disclosure.

FIG. 9A depicts is a pulse sequence diagram illustrating an example implementation of the chirped-CPMG sequence of FIG. 9, in accordance with various aspects of the present disclosure.

FIG. 10 depicts is a pulse sequence diagram illustrating a chirped-CPMG sequence, in accordance with various aspects of the present disclosure.

FIG. 10A depicts is a pulse sequence diagram illustrating an example implementation of the chirped-CPMG sequence of FIG. 10, in accordance with various aspects of the present disclosure.

Corresponding reference characters indicate corresponding parts throughout the several views. The exemplifications set out herein illustrate various disclosed embodiments, is one form, and such exemplifications are not to be construed as limiting the scope thereof in any manner.

DETAILED DESCRIPTION

Applicant of the present application owns the following patent application that was filed on even date herewith and which is each incorporated by reference herein in its entirety:

U.S. patent application Ser. No. 18/153,111, titled ACCELERATING MAGNETIC RESONANCE IMAGING USING PARALLEL IMAGING AND ITERATIVE IMAGE RECONSTRUCTION, filed Jan. 11, 2023.

Applicant of the present application also owns the following patent applications, which are each herein incorporated by reference in their respective entireties:

International Patent Application No. PCT/US2022/72143, titled NEURAL INTERVENTIONAL MAGNETIC RESONANCE IMAGING APPARATUS, filed May 5, 2022;

U.S. patent application Ser. No. 18/057,207, titled SYSTEM AND METHOD FOR REMOVING ELECTROMAGNETIC INTERFERENCE FROM LOW-FIELD MAGNETIC RESONANCE IMAGES, filed Nov. 19, 2022;

U.S. patent application Ser. No. 18/147,418, titled MODULARIZED MULTI-PURPOSE MAGNETIC RESONANCE PHANTOM, filed Dec. 28, 2022;

U.S. patent application Ser. No. 18/147,542, titled INTRACRANIAL RADIO FREQUENCY COIL FOR INTRAOPERATIVE MAGNETIC RESONANCE IMAGING, filed Dec. 28, 2022; and U.S. patent application Ser. No. 18/147,556, titled DEEP LEARNING SUPER-RESOLUTION TRAINING FOR ULTRA LOW-FIELD MAGNETIC RESONANCE IMAGING, filed Dec. 28, 2022.

Before explaining various aspects of neural interventional magnetic resonance imaging devices in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

Various aspects are directed to neural interventional magnetic resonance imaging (MRI) devices that allows for the integration of surgical intervention and guidance with an MRI. This includes granting physical access to the area around the patient as well as access to the patient's head with one or more access apertures. In addition, the neural interventional MRI device may allow for the usage of robotic guidance tools and/or traditional surgical implements. In various instances, a neural interventional MRI can be used intraoperatively to obtain scans of a patient's head and/or brain during a surgical intervention, such as a surgical procedure like a biopsy or neural surgery.

Figure 1:
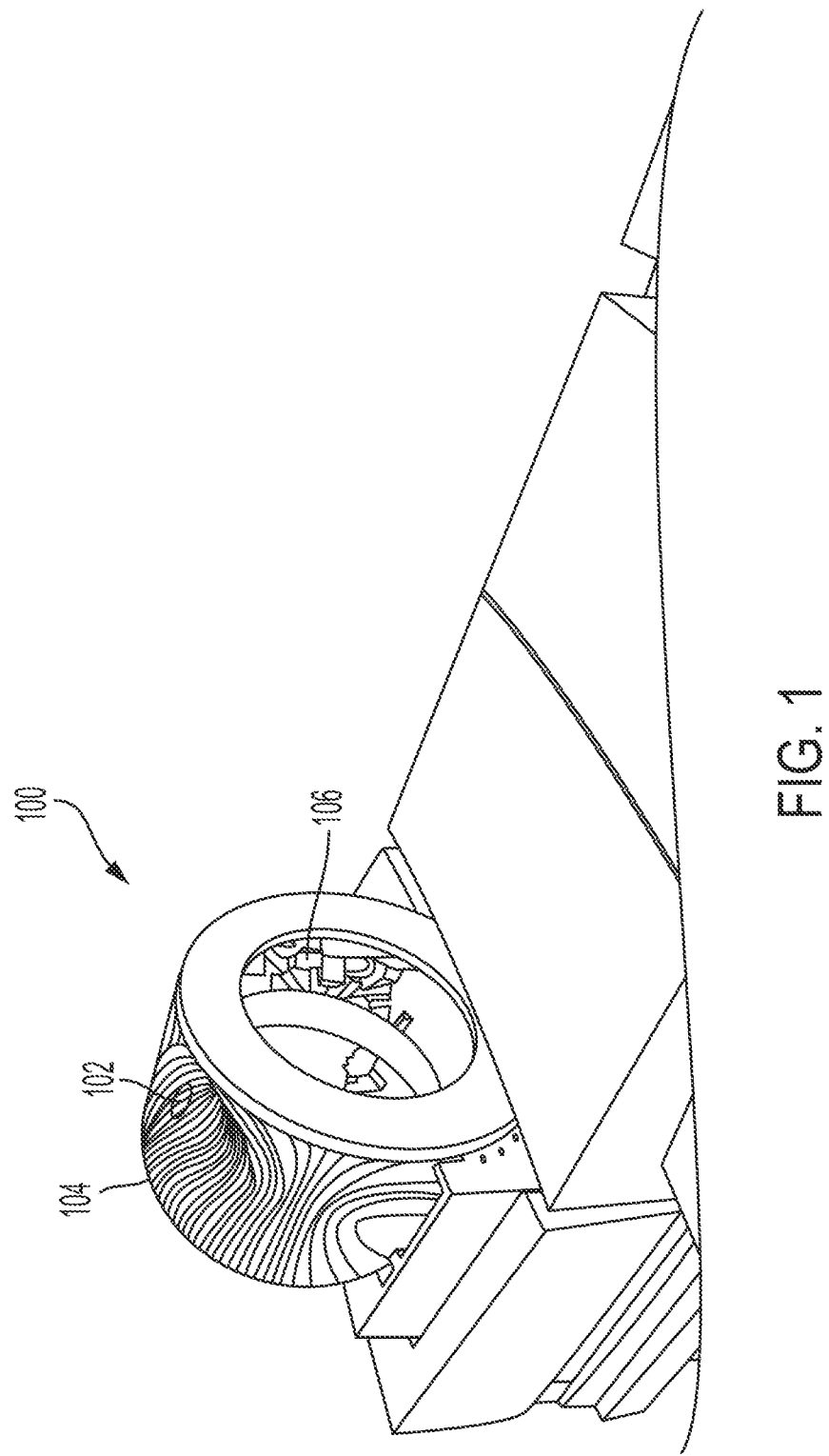
FIG. 1 depicts components of a MRI scanning system including a dome-shaped housing for a magnetic array, the dome-shaped housing surrounding a region of interest therein and further depicting the dome-shaped housing positioned to receive at least a portion of the head of a patient reclined on the table into the region of interest, in accordance with at least one aspect of the present disclosure.

FIG. 1 depicts a MRI scanning system 100 that includes a dome-shaped housing 102 configured to receive a patient's head. The dome-shaped housing 102 can further include at least one access aperture configured to allow access to the patient's head to enable a neural intervention. A space within the dome-shaped housing 102 forms the region of interest for the MRI scanning system 100. Target tissue in the region of interest is subjected to magnetization fields/pulses, as further described herein, to obtain imaging data representative of the target tissue.

Figure 1A:
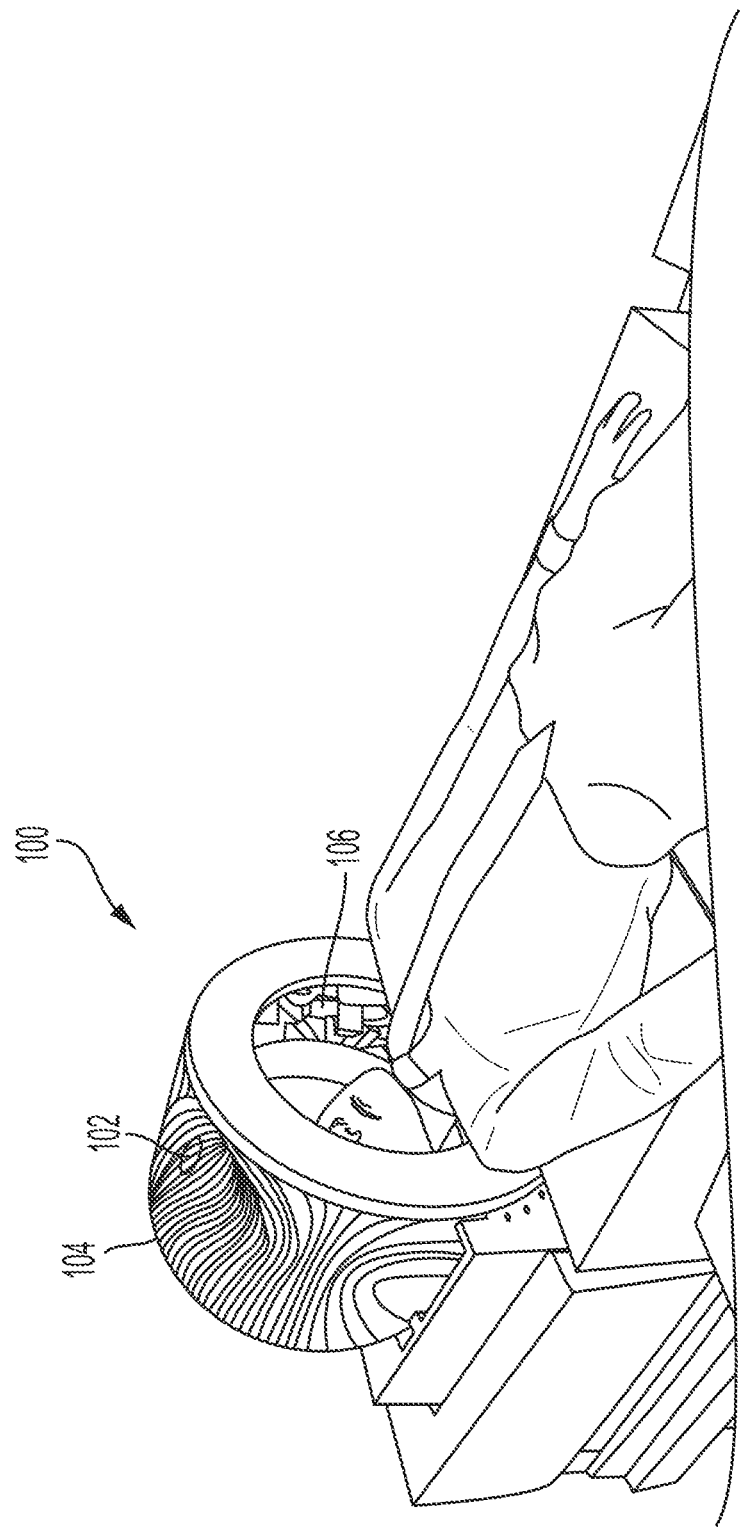
FIG. 1A depicts a patient's head positioned in the region of interest of the MRI scanning system of FIG. 1.

For example, referring to FIG. 1A, a patient can be positioned such that his/her head is positioned within the region of interest within the dome-shaped housing 102. The brain can be positioned entirely within the dome-shaped housing 102. In such instances, to facilitate intracranial interventions (e.g. neurosurgery) in concert with MR imaging, the dome-shaped housing 102 can include one or more apertures that provide access to the brain. Apertures can be spaced apart around the perimeter of the dome-shaped housing.

The MRI scanning system 100 can include an auxiliary cart (see, e.g. auxiliary cart 540 in FIG. 6) that houses certain conventional MRI electrical and electronic components, such as a computer, programmable logic controller, power distribution unit, and amplifiers, for example. The MRI scanning system 100 can also include a magnet cart that holds the dome-shaped housing 102, gradient coil(s), and/or a transmission coil, as further described herein. Additionally, the magnet cart can be attached to a receive coil in various instances. Referring primarily to FIG. 1, the dome-shaped housing 102 can further include RF transmission coils, gradient coils 104 (depicted on the exterior thereof), and shim magnets 106 (depicted on the interior thereof). Alternative configurations for the gradient coil(s) 104 and/or shim magnets 106 are also contemplated. In various instances, the shim magnets 106 can be adjustably positioned in a shim tray within the dome-shaped housing 102, which can allow a technician to granularly configure the magnetic flux density of the dome-shaped housing 102.

Various structural housings for receiving the patient's head and enabling neural interventions can be utilized with a MRI scanning system, such as the MRI scanning system 100. In one aspect, the MRI scanning system 100 may be outfitted with an alternative housing, such as a dome-shaped housing 202 (FIG. 2) or a two-part housing 302 (FIG. 3) configured to form a dome-shape. The dome-shaped housing 202 defines a plurality of access apertures 203; the two-part housing 302 also defines a plurality of access apertures 303 and further includes an adjustable gap 305 between the two parts of the housing.

In various instances, the housings 202 and 302 can include a bonding agent 308, such as an epoxy resin, for example, that holds a plurality of magnetic elements 310 in fixed positions. The plurality of magnetic elements 310 can be bonded to a structural housing 312, such as a plastic substrate, for example. In various aspects, the bonding agent 308 and structural housing 312 may be non-conductive or diamagnetic materials. Referring primarily to FIG. 3, the two-part housing 302 comprises two structural housings 312. In various aspect, a structural housing for receiving the patient's head can be formed from more than two sub-parts. The access apertures 303 in the structural housing 312 provide a passage directly to the patient's head and are not obstructed by the structural housing 312, bonding agent 308, or magnetic elements 310. The access apertures 303 can be positioned in an open space of the housing 302, for example.

There are many possible configurations of neural interventional MRI devices that can achieve improved access for surgical intervention. Many configurations build upon two main designs, commonly known as the Halbach cylinder and the Halbach dome described in the following article: Cooley et al. (e.g. Cooley, C. Z., Haskell, M. W., Cauley, S. F., Sappo, C., Lapierre, C. D., Ha, C. G., Stockmann, J. P., & Wald, L. L. (2018). Design of sparse Halbach magnet arrays for portable MRI using a genetic algorithm. *IEEE transactions on magnetics*, 54(1), 5100112. The article "Design of sparse Halbach magnet arrays for portable MRI using a genetic algorithm" by Cooley et al., published in *IEEE transactions on magnetics*, 54(1), 5100112 in 2018, is incorporated by reference herein in its entirety.

In various instances, a dome-shaped housing for an MRI scanning system, such as the system 100, for example, can include a Halbach dome defining a dome shape and configured based on several factors including main magnetic field $B_0$ strength, field size, field homogeneity, device size, device weight, and access to the patient for neural intervention. In various aspects, the Halbach dome comprises an exterior radius and interior radius at the base of the dome. The Halbach dome may comprise an elongated cylindrical portion that extends from the base of the dome. In one aspect, the elongated cylindrical portion comprises the same exterior radius and interior radius as the base of the dome and continues from the base of the dome at a predetermined length, at a constant radius. In another aspect, the elongated cylindrical portion comprises a different exterior radius and interior radius than the base of the dome (see e.g. FIGS. 2 and 3). In such instances, the different exterior radius and interior radius of the elongated cylindrical portion can merge with the base radii in a transitional region.

Figure 4:
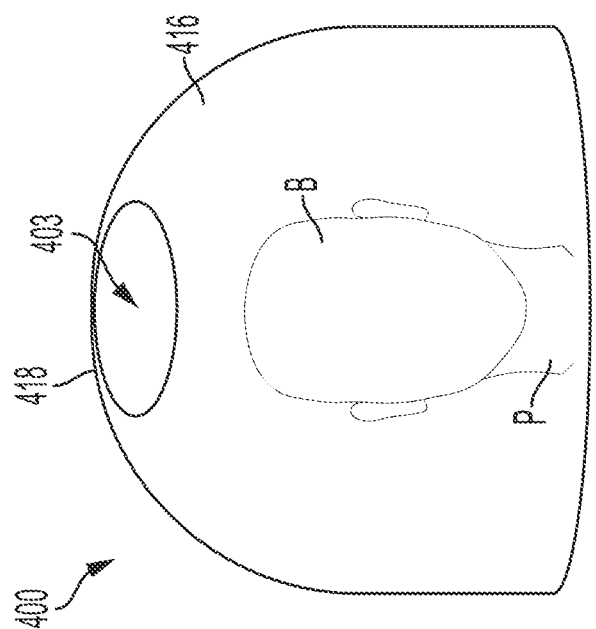
FIG. 4 depicts a dome-shaped housing for use with a MRI scanning system having an access aperture in the form of a centrally-defined hole, in accordance with at least one aspect of the present disclosure.

FIG. 4 illustrates an exemplary Halbach dome 400 for an MRI scanning system, such as the system 100, for example, which defines an access aperture in the form of a hole or access aperture 403, where the dome 400 is configured to receive a head and brain B of the patient P within the region of interest therein, and the access aperture 403 is configured to allow access to the patient P to enable neural intervention with a medical instrument and/or robotically-controlled surgical tool, in accordance with at least one aspect of the present disclosure. The Halbach dome 400 can be built with a single access aperture 403 at the top side 418 of the dome 400, which allows for access to the top of the skull while minimizing the impact to the magnetic field. Additionally or alternatively, the dome 300 can be configured with multiple access apertures around the structure 416 of the dome 400, as shown in FIGS. 2 and 3.

The diameter $D_{hole}$ of the access aperture 403 may be small (e.g. about 2.54 cm) or very large (substantially the exterior $r_{ext}$ diameter of the dome 400). As the access aperture 403 becomes larger, the dome 400 begins to resemble a Halbach cylinder, for example. The access aperture 403 is not limited to being at the apex of the dome 400. The access aperture 403 can be placed anywhere on the surface or structure 416 of the dome 400. In various instances, the entire dome 400 can be rotated so that the access aperture 403 can be co-located with a desired physical location on the patient P.

Figure 5:
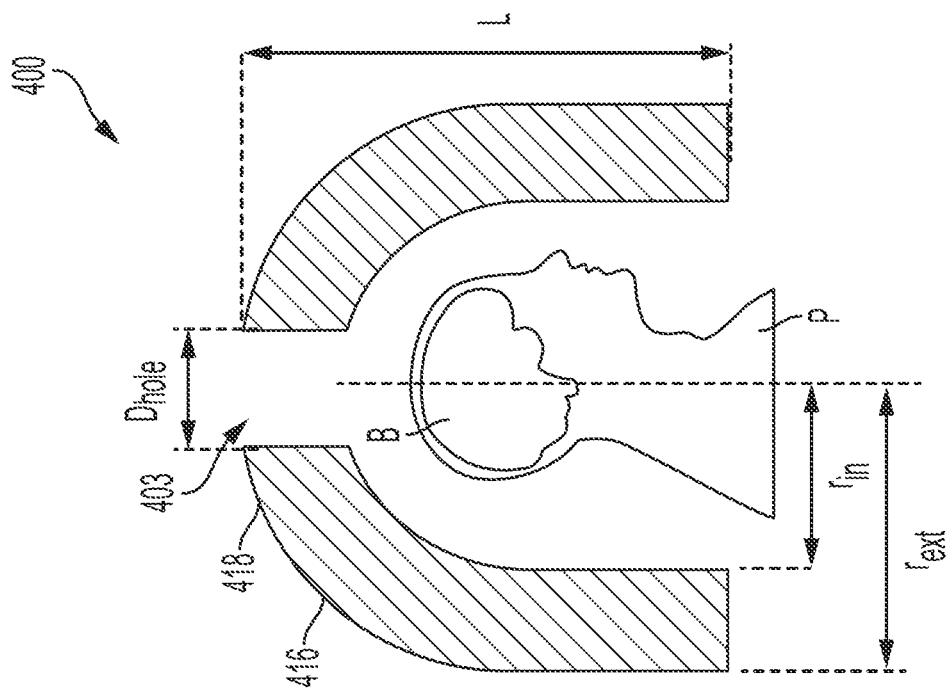
FIG. 5 is a cross-sectional view of the dome-shaped housing of FIG. 4, in accordance with at least one aspect of the present disclosure.

FIG. 5 depicts relative dimensions of the Halbach dome 400, including a diameter $D_{hole}$ of the access aperture 403, a length L of the dome 400, and an exterior radius $r_{ext}$ and an interior radius $r_{in}$ of the dome 400. The Halbach dome 400 comprises a plurality of magnetic elements that are configured in a Halbach array and make up a magnetic assembly. The plurality of magnetic elements may be enclosed by the exterior radius $r_{ext}$ and interior radius $r_{in}$ in the structure 416 or housing thereof. In one aspect, example dimensions may be defined as: $r_{in}$=19.3 cm; $r_{ext}$=23.6 cm; L=38.7 cm; and 2.54 cm≤D<19.3 cm.

Based on the above example dimensions, a Halbach dome 400 with an access aperture 403 may be configured with a magnetic flux density $B_0$ of around 72 mT, and an overall mass of around 35 kg. It will be appreciated that the dimensions may be selected based on particular applications to achieve a desired magnetic flux density $B_0$, total weight of the Halbach dome 400 and/or magnet cart, and geometry of the neural intervention access aperture 403.

In various aspects, the Halbach dome 400 may be configured to define multiple access apertures 403 placed around the structure 416 of the dome 400. These multiple access apertures 403 may be configured to allow for access to the patient's head and brain B using tools (e.g., surgical tools) and/or a surgical robot.

In various aspects, the access aperture 403 may be adjustable. The adjustable configuration may provide the ability for the access aperture 403 to be adjusted using either a motor, mechanical assist, or a hand powered system with a mechanical iris configuration, for example, to adjust the diameter $D_{hole}$ of the access aperture 403. This would allow for configuration of the dome without an access aperture 403, conducting an imaging scan, and then adjusting the configuration of the dome 400 and mechanical iris thereof to include the access aperture 403 and, thus, to enable a surgical intervention therethrough.

Halbach domes and magnetic arrays thereof for facilitating neural interventions are further described in International Patent Application No. PCT/US2022/72143, titled NEURAL INTERVENTIONAL MAGNETIC RESONANCE IMAGING APPARATUS, filed May 5, 2022, which is incorporated by reference herein in its entirety.

Figure 6:
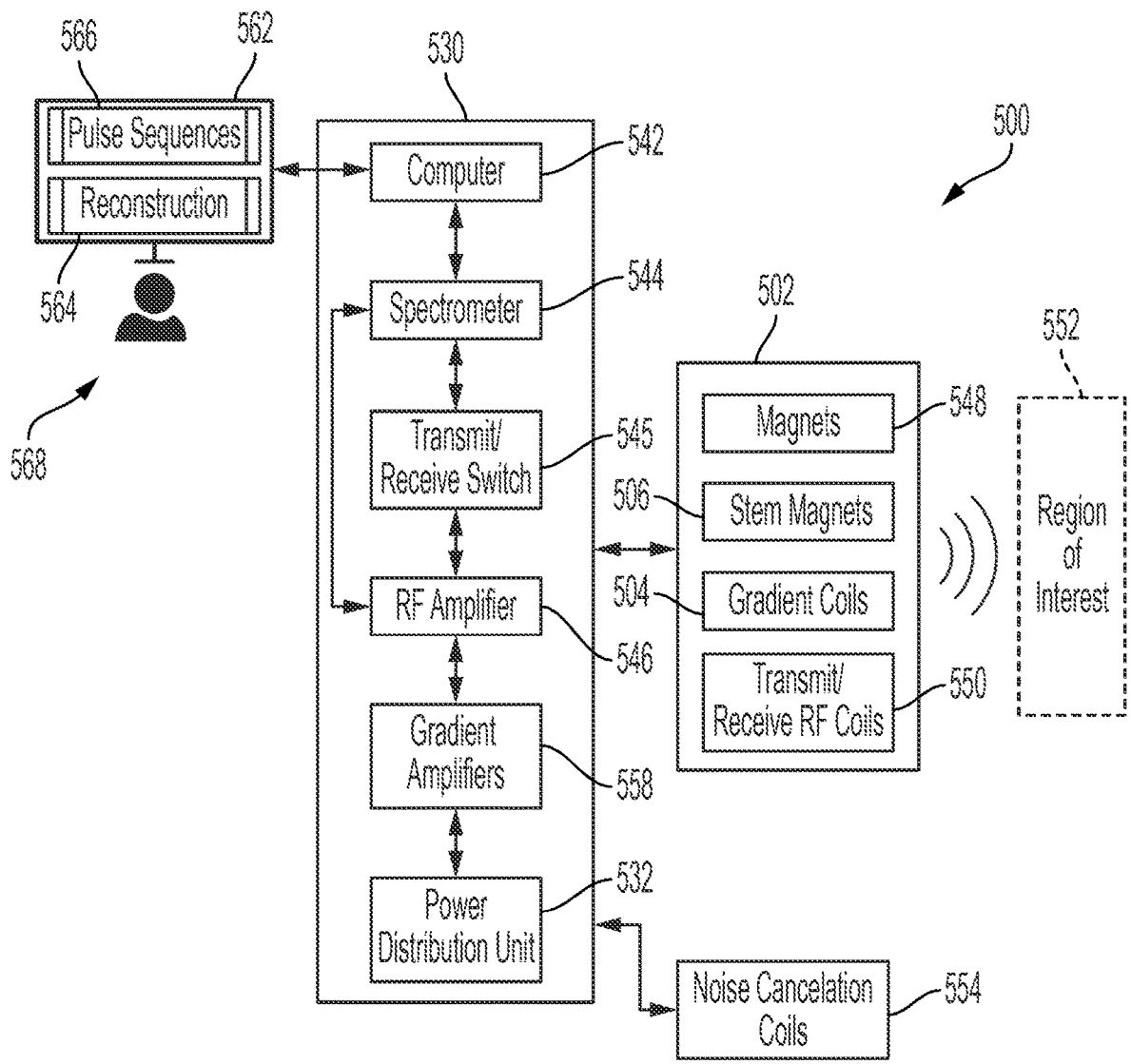
FIG. 6 depicts a control schematic for a MRI system, in accordance with at least one aspect of the present disclosure.

Referring now to FIG. 6, a schematic for an MRI system 500 is shown. The MRI scanning system 100 (FIG. 1) and the various dome-shaped housings and magnetic arrays therefor, which are further described herein, for example, can be incorporated into the MRI system 500, for example. The MRI system 500 includes a housing 502, which can be similar in many aspects to the dome-shaped housings 102 (FIG. 1), 202 (FIG. 2), and/or 302 (FIG. 3), for example. The housing 502 is dome-shaped and configured to form a region of interest, or field of view, 552 therein. For example, the housing 502 can be configured to receive a patient's head in various aspects of the present disclosure.

The housing 502 includes a magnet assembly 548 having a plurality of magnets arranged therein (e.g. a Halbach array of magnets). In various aspect, the main magnetic field $B_0$, generated by the magnetic assembly 548, extends into the field of view 552, which contains an object (e.g. the head of a patient) that is being imaged by the MRI system 500.

The MRI system 500 also includes RF transmit/receive coils 550. The RF transmit/receive coils 550 are combined into integrated transmission-reception (Tx/Rx) coils. In other instances, the RF transmission coil can be separate from the RF reception coil. For example, the RF transmission coil(s) can be incorporated into the housing 502 and the RF reception coil(s) can be positioned within the housing 502 to obtain imaging data.

The housing 502 also includes one or more gradient coils 504, which are configured to generate gradient fields to facilitate imaging of the object in the field of view 552 generated by the magnet assembly 548, e.g., enclosed by the dome-shaped housing and dome-shaped array of magnetic elements therein. Shim trays adapted to receive shim magnets 506 can also be incorporated into the housing 502.

During the imaging process, the main magnetic field $B_0$ extends into the field of view 552. The direction of the effective magnetic field ($B_1$) changes in response to the RF pulses and associated electromagnetic fields transmitted by the RF transmit/receive coils 550. For example, the RF transmit/receive coils 550 may be configured to selectively transmit RF signals or pulses to an object in the field of view 552, e.g. tissue of a patient's brain. These RF pulses may alter the effective magnetic field experienced by the spins in the sample tissue.

The housing 502 is in signal communication with an auxiliary cart 530, which is configured to provide power to the housing 502 and send/receive control signals to/from the housing 502. The auxiliary cart 530 includes a power distribution unit 532, a computer 542, a spectrometer 544, a transmit/receive switch 545, an RF amplifier 546, and gradient amplifiers 558. In various instances, the housing 502 can be in signal communication with multiple auxiliary carts and each cart can support one or more of the power distribution unit 532, the computer 542, the spectrometer 544, the transmit/receive switch 545, the RF amplifier 546, and/or the gradient amplifiers 558.

The computer 542 is in signal communication with a spectrometer 544 and is configured to send and receive signals between the computer 542 and the spectrometer 544. When the object in the field of view 552 is excited with RF pulses from the RF transmit/receive coils 550, the precession of the object results in an induced electric current, or MR current, which is detected by the RF transmit/receive coils 550 and sent to the RF preamplifier 556. The RF preamplifier 556 is configured to boost or amplify the excitation data signals and send them to the spectrometer 544. The spectrometer 544 is configured to send the excitation data to the computer 542 for storage, analysis, and image construction. The computer 542 is configured to combine multiple stored excitation data signals to create an image, for example. In various instances, the computer 542 is in signal communication with at least one database 562 that stores reconstruction algorithms 564 and/or pulse sequences 566. The computer 542 is configured to utilize the reconstruction algorithms to generate an MR image 568.

From the spectrometer 544, signals can also be relayed to the RF transmit/receive coils 550 in the housing 502 via an RF power amplifier 546 and the transmit/receive switch 545 positioned between the spectrometer 544 and the RF power amplifier 546. From the spectrometer 544, signals can also be relayed to the gradient coils 560 in the housing 502 via a gradient power amplifier 558. For example, the RF power amplifier 546 is configured to amplify the signal and send it to RF transmission coils 560, and the gradient power amplifier 558 is configured to amplify the gradient coil signal and send it to the gradient coils 560.

In various instances, the MRI system 500 can include noise cancellation coils 554. For example, the auxiliary cart 530 and/or computer 542 can be in signal communication with noise cancellation coils 554. In other instances, the noise cancellation coils 554 can be optional. For example, certain MRI systems disclosed herein may not include supplemental/auxiliary RF coils for detecting and canceling electromagnetic interference, i.e. noise.

Figure 7:
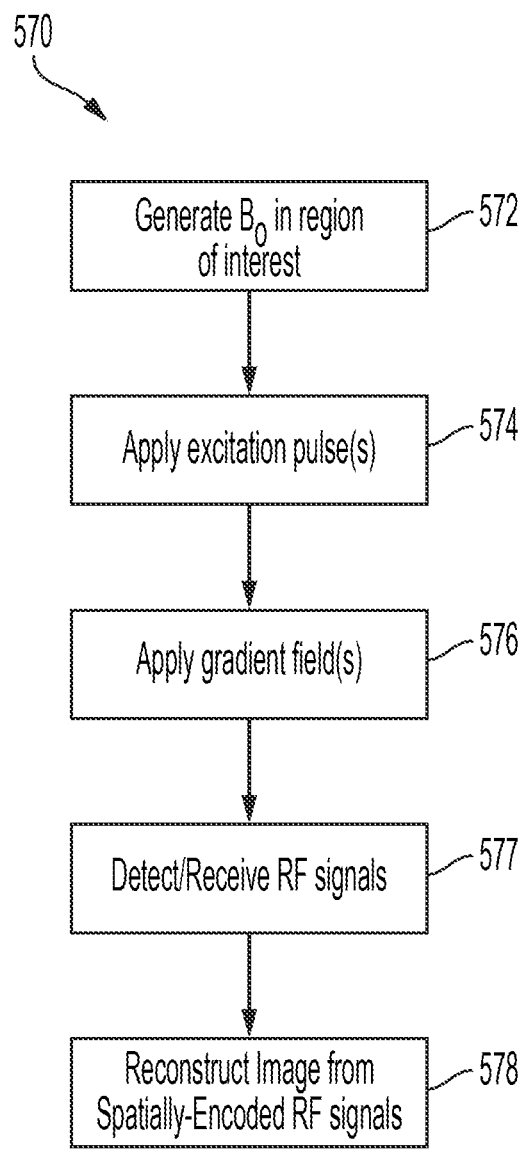
FIG. 7 is a flowchart describing a method for obtaining imaging data from an MRI system, in accordance with at least one aspect of the present disclosure.

A flowchart depicting a process 570 for obtaining an MRI image is shown in FIG. 7. The flowchart can be implemented by the MRI system 500, for example. In various instances, at block 572, the target subject (e.g. a portion of a patient's anatomy), is positioned in a main magnetic field $B_0$ in an interest of region (e.g. region of interest 552), such as within the dome-shaped housing of the various MRI scanners further described herein (e.g. magnet assembly 548). The main magnetic field $B_0$ is configured to magnetically polarize the hydrogen protons (1H-protons) of the target subject (e.g. all organs and tissues) and is known as the net longitudinal magnetization Mo. It is proportional to the proton density (PD) of the tissue and develops exponentially in time with a time constant known as the longitudinal relaxation time T1 of the tissue. T1 values of individual tissues depend on a number of factors including their microscopic structure, on the water and/or lipid content, and the strength of the polarizing magnetic field, for example. For these reasons, the T1 value of a given tissue sample is dependent on age and state of health.

At block 574, a time varying oscillatory magnetic field $B_1$, i.e. an excitation pulse, is applied to the magnetically polarized target subject with a RF coil (e.g. RF transmit/receive coil 550). The carrier frequency of the pulsed $B_1$ field is set to the resonance frequency of the 1H-proton, which causes the longitudinal magnetization to flip away from its equilibrium longitudinal direction resulting in a rotated magnetization vector, which in general can have transverse as well as longitudinal magnetization components, depending on the flip angle used. Common $B_1$ pulses include an inversion pulse, or a 180-degree pulse, and a 90-degree pulse. A 180-degree pulse reverses the direction of the 1H-proton's magnetization in the longitudinal axis. A 90-degree pulse rotates the 1H-proton's magnetization by 90 degrees so that the magnetization is in the transverse plane. The MR signals are proportional to the transverse components of the magnetization and are time varying electrical currents that are detected with suitable RF coils. These MR signals decay exponentially in time with a time constant known as the transverse relaxation time T2, which is also dependent on the microscopic tissue structure, water/lipid content, and the strength of the magnetic field used, for example.

At block 576, the MR signals are spatially encoded by exposing the target subject to additional magnetic fields generated by gradient coils (e.g. gradient coils 560), which are known as the gradient fields. The gradient fields, which vary linearly in space, are applied for short periods of time in pulsed form and with spatial variations in each direction. The net result is the generation of a plurality of spatially encoded MR signals, which are detected at block 577, and which can be reconstructed to form MR images depicting slices of the examination subject. A RF reception coil (e.g. RF transmit/receive coil 550) can be configured to detect the spatially-encoded RF signals. Slices may be oriented in the transverse, sagittal, coronal, or any oblique plane.

At block 578, the spatially encoded signals of each slice of the scanned region are digitized and spatially decoded mathematically with a computer reconstruction program (e.g. by computer 542) in order to generate images depicting the internal anatomy of the examination subject. In various instances, the reconstruction program can utilize an (inverse) Fourier transform to back-transforms the spatially-encoded data (k-space data) into geometrically decoded data.

Figure 8:
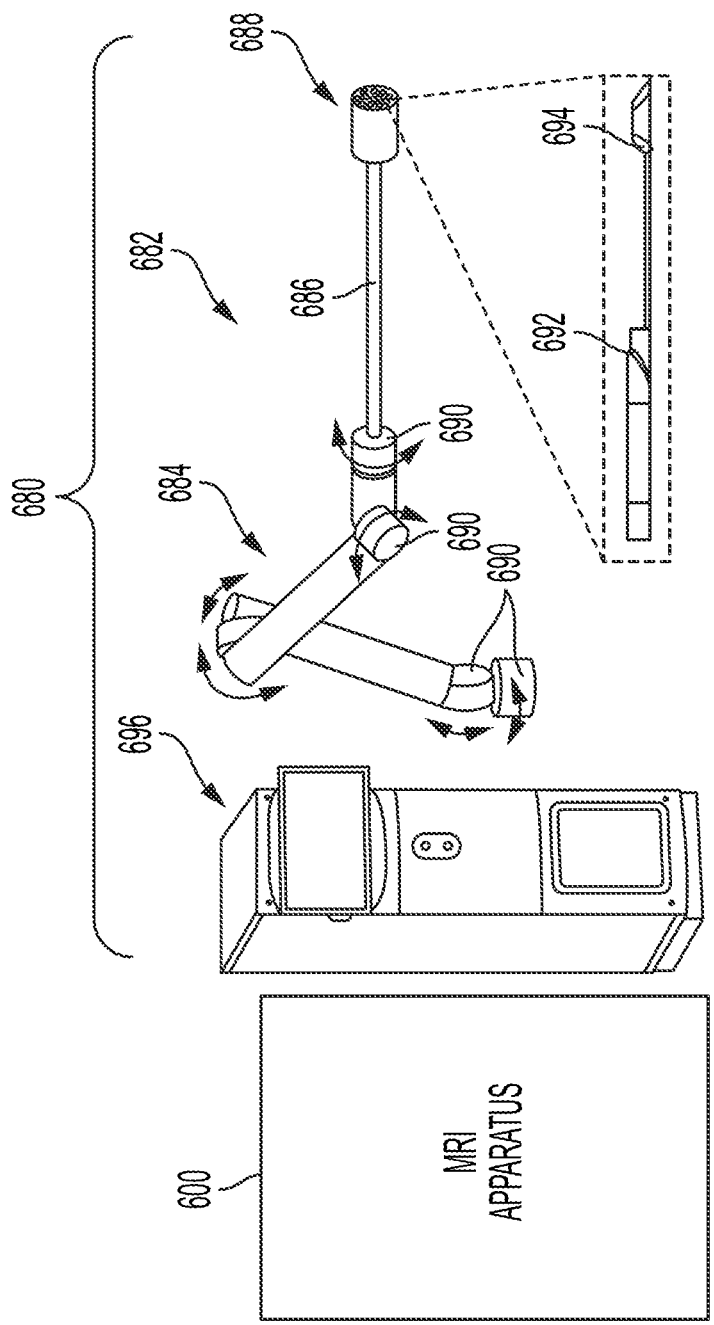
FIG. 8 depicts a MRI scanning system and a robotic system, in accordance with at least one aspect of the present disclosure.

FIG. 8 depicts a graphical illustration of a robotic system 680 that may be used for neural intervention with an MRI scanning system 600. The robotic system 680 includes a computer system 696 and a surgical robot 682. The MRI scanning system 600 can be similar to the MRI system 500 and can include the dome-shaped housing and magnetic arrays having access apertures, as further described herein.

For example, the MRI system 500 can include one or more access apertures defined in a Halbach array of magnets in the permanent magnet assembly to provide access to one or more anatomical parts of a patient being imaged during a medical procedure. In various instances, a robotic arm and/or tool of the surgical robot 682 is configured to extend through an access aperture in the permanent magnet assembly to reach a patient or target site. Each access aperture can provide access to the patient and/or surgical site. For example, in instances of multiple access apertures, the multiple access apertures can allow access from different directions and/or proximal locations.

In accordance with various embodiments, the robotic system 680 is configured to be placed outside the MRI system 600. As shown in FIG. 8, the robotic system 680 can include a robotic arm 684 that is configured for movements with one or more degrees of freedom. In accordance with various embodiments, the robotic arm 684 includes one or more mechanical arm portions, including a hollow shaft 686 and an end effector 688. The hollow shaft 686 and end effector 688 are configured to be moved, rotated, and/or swiveled through various ranges of motion via one or more motion controllers 690. The double-headed curved arrows in FIG. 8 signify exemplary rotational motions produced by the motion controllers 690 at the various joints in the robotic arm 684.

In accordance with various embodiments, the robotic arm 684 of the robotic system 682 is configured for accessing various anatomical parts of interest through or around the MRI scanning system 600. In accordance with various embodiments, the access aperture is designed to account for the size of the robotic arm 684. For example, the access aperture defines a circumference that is configured to accommodate the robotic arm 684, the hollow shaft 686, and the end effector 688 therethrough. In various instances, the robotic arm 684 is configured for accessing various anatomical parts of the patient from around a side of the magnetic imaging apparatus 600. The hollow shaft 686 and/or end effector 688 can be adapted to receive a robotic tool 692, such as a biopsy needle having a cutting edge 694 for collecting a biopsy sample from a patient, for example.

The reader will appreciate that the robotic system 682 can be used in combination with various dome-shaped and/or cylindrical magnetic housings further described herein. Moreover, the robotic system 682 and robotic tool 692 in FIG. 8 are exemplary. Alternative robotic systems can be utilized in connection with the various MRI systems disclosed herein. Moreover, handheld surgical instruments and/or additional imaging devices (e.g. an endoscope) and/or systems can also be utilized in connection with the various MRI systems disclosed herein.

In various aspects of the present disclosure, the MRI systems described herein can comprise low field MRI (LF-MRI) systems. In such instances, the main magnetic field $B_0$ generated by the permanent magnet assembly can be between 0.1 T and 1.0 T, for example. In other instances, the MRI systems described herein can comprise ultra-low field MRI (ULF-MRI) systems. In such instances, the main magnetic field $B_0$ generated by the permanent magnet assembly can be between 0.03 T and 0.1 T, for example.

Higher magnetic fields, such as magnetic fields above 1.0 T, for example, can preclude the use of certain electrical and mechanical components in the vicinity of the MRI scanner. For example, the existence of surgical instruments and/or surgical robot components comprising metal, specially ferrous metals, can be dangerous in the vicinity of higher magnetic fields because such tools can be drawn toward the source of magnetization. Moreover, higher magnetic fields often require specifically-designed rooms with additional precautions and shielding to limit magnetic interference. Despite the limitations on high field MRI systems, low field and ultra-low field MRI systems present various challenges to the acquisition of high quality images with sufficient resolution for achieving the desired imaging objectives.

LF- and ULF-MRI systems may generally define an overall magnetic field homogeneity that is relatively poor in comparison to higher field MRI systems. For example, a dome-shaped housing for an array of magnets, as further described herein, can comprise a Halbach array of permanent magnets, which generate a magnetic field $B_0$ having a homogeneity between 1,000 ppm and 10,000 ppm in the region of interest in various aspects of the present disclosure.

The relatively poor homogeneity (e.g., the inhomogeneity) of the magnetic field $B_0$ and/or the effective magnetic field $B_1$ generally defined by LF- and ULF-MRI systems can present various challenges. For example, typical RF pulses, such as hard pulses, sinc pulses, and/or fixed-frequency pulses generated using LF- and ULF-MRI systems can fail to excite the entire target subject in the region of interest because of the limited power used to generate the RF pulses. Further, typical RF pulses generated using LF- and ULF-MRI systems may excite only a limited bandwidth of spins. Thus, it can be difficult to produce images with an adequate signal-to-noise (SNR) ratio using LF- and ULF-MRI systems.

Various techniques can be implemented to improve the SNR of images generated by LF- and ULF-MRI systems. One technique involves the generation of frequency-swept pulses (sometimes referred to chirped pulses) as part of a modified Carr-Purcell Meiboom-Gill (CPMG) sequence. Frequency-swept pulses can be generated by modulating from an initial frequency to a final frequency at a particular sweep rate throughout the duration of the RF pulse. As a result, compared to typical RF pulses, frequency swept RF pulses can excite a given bandwidth of spins using a signal that has a lower maximum amplitude. As described in "Quadrupolar nuclear magnetic resonance spectroscopy in solids using frequency-swept echoing pulses" by Bhattacharyya et al., published in *The Journal of Chamical Physics*, 127, 194503 in 2007, which is incorporated by reference herein in its entirety, combinations of frequency-swept pulses can be used to generate a spin echo. And as described in "Chirped CPMG for well-logging NMR application" by Casabianca et al., published in *Journal of Magnetic Resonance*, 242, 197-202 in 2014, which is incorporated by reference herein in its entirety, frequency-swept pulses can be implemented as part of a "chirped-CPMG sequence." The chirped-CPMG sequence can be used to achieve improved SNR for proton-density-weighted images and T1-weighted images generated using LF- and ULF-MRI systems.

However, various challenges remain despite the improvements offered by the chirped-CPMG sequence. For example, traditional T2-weighted imaging (T2w) sequences and diffusional-weighted imaging (DWI) sequences typically rely on a long echo time (TE) (e.g., a TE that is in a range of 3 to 5 times greater than T2) and/or a long repetition time (TR) (e.g., a TR that is in a range of 3 to 5 times greater than T1) to achieve the desired image contrast. Because of the long TE, applying T2w or DWI to a chirped-CPMG sequence can result in a poor SNR. Similarly, because of the long TR, applying T2w or DWI to a chirped-CPMG sequence can result in a long acquisition time. Accordingly, a need exists for systems and methods for increasing SNR and/or reducing TR produced by chirped-CPMG sequences, such as T2w or DWI chirped-CPMG sequences.

In various aspects, the present disclosure provides systems and methods for implementing chirped-CPMG sequences that produce a reduced TR compared to traditional chirped-CPMG sequences. The chirped-CPMG sequences provided herein can include a recovery pulse following a spin-echo train. In some aspects, the recovery pulse is a 900 frequency-swept pulse that has the opposite phase (e.g., +/−180°) of an initial 90° excitation pulse of the sequence. The recovery pulse can flip transverse magnetism induced by the initial excitation pulse and subsequent refocusing pulse(s) back to the longitudinal axis, thereby reducing TR. The recovery pulse can achieve a reduced TR without substantially compromising SNR or inducing unwanted T1 weighting. Thus, various chirped-CPMG sequences provided herein can reduce total acquisition time compared to traditional chirped-CPMG sequences, thereby improving efficiency and patient comfort.

In various aspects, the systems and methods provided herein can implement T2w chirped-CPMG sequences and/or DWI chirped-CPMG sequences by implementing a T2w preparation sequence and/or a DWI preparation sequence prior to the primary chirped-CPMG sequence. The T2w preparation sequence can include a first preparation pulse that is a 90° excitation pulse, a second preparation pulse that is a 180° refocusing pulse, and a third preparation pulse that is a 90° recovery pulse. The DWI preparation sequence can be similar to the T2w preparation sequence described immediately above except that the DWI preparation sequence includes (i) a first diffusion gradient intermediate the first preparation pulse and the second preparation pulse and (ii) a second diffusion gradient intermediate the second preparation pulse and the third preparation pulse. The various preparation sequences described herein can be implemented prior to any of the primary chirped-CPMG sequences described herein to support a desired contrast for imaging.

In various aspects, the preparation sequences disclosed herein can be implemented achieve a T2w chirped-CPMG sequence and/or a DWI chirped-CPMG sequence with improved signal quality and/or reduced total acquisition time compared to a T2w chirped-CPMG sequence and/or DWI chirped-CPMG sequence that does not implement the preparation sequence. For example, as noted above, T2 weighting can be achieved by configuring a multi-echo CPMG sequence to generate a long TE. Traditionally, there are two methods of configuring a multi-echo CPMG sequence to generate a long TE. First, while maintaining CPMG sequence conditions, the time interval between 180° refocusing pulses can be increased so that the effective TE (e.g., and the time during which the center of the k-space is collected) becomes longer. However, this method is prone to signal artifacts and unnecessary signal loss because of the longer wait time between echoes. Second, while breaking CPMG sequence conditions, the time interval of the 900 excitation pulse and the first two 180° refocusing pulses can be increased. However, by breaking the CPMG sequence conditions, the acquisition can become prone to signal artifacts. The preparation sequences disclosed herein can induce T2w while enabling the subsequent primary chirped-CPMG sequence to maintain a relatively short interval between the 180° refocusing pulses and maintain the CMPG sequence conditions. For example, the preparation sequences disclosed herein can generate T2 contrast by: (i) implementing a 90° excitation pulse to flip longitudinal magnetization onto the transverse plane; (ii) at first time interval following the 90° excitation pulse (e.g. a time interval long enough to achieve T2 contrast (exp(−t/T2)), implementing a 180° refocusing pulse to invert and rephase the transverse magnetization, thereby adding T2 contrast and generating a spin echo at a second time interval following the refocusing pulse that is equivalent to the first time interval between the excitation pulse and the refocusing pulse; and (3) at the time of the spin echo, implementing 90° recovery pulse to flip transverse magnetism back to the longitudinal plane. A T2w acquisition can then be carried out by implementing the primary chirped-CPMG sequence following the preparation sequence. Accordingly, compared to traditional chirped-CPMG sequences, the systems and methods provided herein can achieve improved SNR and/or reduced TR for T2w chirped-CPMG sequences and DWI chirped-CPMG sequences.

FIG. 9 is a pulse sequence diagram illustrating a chirped-CPMG sequence 1000, according to at least one non-limiting aspect of the present disclosure. In some aspects, the chirped-CPMG sequence 1000 can be the same or similar to the chirped-CPMG sequences described in the aforementioned publication titled "Chirped CPMG for well-logging NMR application" by Casabianca et al. The various MRI systems described herein can be configured to implement the chirped-CPMG sequence 1000. For example, referring to FIGS. 6 and 10, the chirped-CPMG sequence 1000 can be a pulse sequence 566 stored in the database 562 of the MRI system 500. The RF transmit/receive coils 550 can be configured to generate the pulses of the chirped-CPMG sequence 1000 and/or detect the spin echo signals of the chirped-CPMG sequence 1000.

Referring again to FIG. 9, the chirped-CPMG sequence 1000 includes an excitation pulse 1002 followed by a series of refocusing pulses 1004, 1006. The excitation pulse 1004 can be configured to induce a flip angle of 90°. Each of the series of refocusing pulses 1004, 1006 can be configured to induce a flip angle of 180°. An RF pulsed described as being configured to induce a specific flip angle (e.g., 90°, 180°) is sometimes referred to herein as an RF pulse of the specific flip angle (e.g., a 90° RF pulse, a 180° RF pulse). Thus, the excitation pulse 1002 can be a 90° pulse and each of the series of refocusing pulses 1004, 1006 can be 180° pulses. Accordingly, the chirped-CPMG sequence 1000 can be configured to induce a spin-echo train.

As illustrated by FIG. 9, the series of refocusing pulses 1004, 1006 following the excitation pulse 1002 can include sequentially repeating first refocusing pulses 1004 and second refocusing pulses 1006. The excitation pulse 1002 can have a first phase $\phi_1$, each of the first refocusing pulses 1004 can have a second phase $\phi_2$, and each of the each of the second refocusing pulses 1006 can have a third phase $\phi_3$. The second phase $\phi_2$ can be shifted 90° (e.g., +/−90°) with respect to the first phase $\phi_1$, similar to a traditional CPMG sequence. The third phase $\phi_3$ can be shifted 90° (e.g., +/−90°) with respect to the second phase $\phi_2$.

FIG. 9A is a pulse sequence diagram illustrating a chirped-CPMG sequence 1000a. The chirped-CPMG sequence 1000a provides an example implementation of the chirped-CPMG sequence 1000 of FIG. 9. As shown in FIG. 9A, the excitation pulse 1002a has a first phase $\phi_1$ oriented in the +y direction along the transverse axis, the first refocusing pulses 1004a have a second phase $\phi_2$ oriented in the +x direction along the transverse axis (shifted 90° with respect to the first phase $\phi_1$), and each of the second refocusing pulses 1006a have a third phase $\phi_3$ oriented in the +y direction along the transverse axis (shifted 90° with respect to the second phase $\phi_2$).

Referring again to FIG. 9, the excitation pulse 1002, each of the first refocusing pulses 1004, and/or each of the second refocusing pulses 1006 can be frequency-swept pulses. In some aspects, the excitation pulse 1002, each of the first refocusing pulses 1004, and each of the second refocusing pulses 1006 are frequency swept across the same frequency offset range. The frequency offset range can be defined by an initial frequency offset $O_i$ and a final frequency offset $O_f$. The initial frequency offset $O_i$ and the final frequency offset $O_f$ can be selected based on a target resonance frequency. For example, the initial frequency offset $O_i$ and the final frequency offset $O_f$ can be selected such that the frequency sweep of the pulse is symmetric about the target resonance frequency.

The excitation pulse 1002 can have an excitation pulse duration $T_{exe}$ and each of the first refocusing pulses 1004 and the second refocusing pulses 1006 can have a refocusing pulse duration $T_{ref}$. The excitation pulse 1002 can be frequency swept at constant excitation sweep rate $R_{exe}$ from the initial frequency offset $O_i$ to the final frequency offset $O_f$ over the excitation pulse duration $T_{exe}$. Each of the first refocusing pulses 1004 and the second refocusing pulses 1006 can be frequency swept at constant refocusing sweep rate $R_{ref}$ from the initial frequency offset $O_i$ to the final frequency offset $O_f$ over the refocusing pulse duration $T_{ref}$. In some aspects, refocusing sweep rate $R_{ref}$ can be twice the excitation sweep rate $R_{exe}$ and the refocusing pulse duration $T_{ref}$ can be half the excitation pulse duration $T_{exe}$. For example, the chirped-CPMG sequence 1000a of FIG. 9A illustrates an example implementation of the chirped-CPMG sequence 1000 of FIG. 9 where each of the first refocusing pulses 1004 and the second refocusing pulses 1006 having refocusing pulse duration $T_{ref}$ equal to $T_{exe}/2$.

Referring again to FIG. 9, the excitation pulse 1002 and the first refocusing pulse 1004 can cause the generation of an echo signal 1008. Further, additional echo signals 1008 can be generated by the series of refocusing pulses 1004, 1006. The echo signals 1008 can be spatially encoded by applying a gradient field, detected by an RF coil assembly, and used for image construction (e.g. according to blocks 576, 577, and 578 of method 570 described with respect to FIG. 6). The initial echo signal 1008 forms at a time $T_{echo}$ after the first refocusing pulse 1004. In some aspects, $T_{echo}$ can be controlled based on the excitation pulse duration $T_{exe}$, the refocusing pulse duration $T_{ref}$, and/or the time $T_\delta$ between the excitation pulse 1002 and the first refocusing pulse 1004. For example, as illustrated by the example chirped-CPMG sequence 1000a of FIG. 9A, where the refocusing pulse duration $T_{ref}$ is set to half the excitation pulse duration ($T_{ref}=T_{exe}/2$), the echo 1008 can be formed at a time $T_{echo}$ equal to $T_\delta+T_{exe}/2$.

Referring again to FIG. 9, the echo signals 1008 can have an acquisition phase $\phi_{acq}$. In some aspects, the acquisition phase $\phi_{acq}$ of the echo signals 1008 are shifted 90° (e.g., +/−90°) with respect to the first phase $\phi_1$ of the excitation pulse 1002. For example, as illustrated by the example chirped-CPMG sequence 1000a of FIG. 9A, the echo signals 1008 have an acquisition phase $\phi_{acq}$ oriented in the +x direction along the transverse axis (e.g., shifted 90° with respect to the first phase $\phi_1$, which is oriented in the +y direction).

As noted above, frequency-swept pulses can excite a larger bandwidth of spins compared to traditional hard pulses utilizing the same RF peak power. In some aspects, by applying frequency-swept pulses according to the chirped-CPMG sequence 1000, the number of spins contributing to the echo signals 1008 can be more than 4 times the number of spins contributing to echo signals of a traditional CPMG sequence that utilizes hard pulses. Thus, chirped-CPMG sequence 1000 can be implemented to achieve a higher SNR compared to those achievable using a traditional CPMG at the same RF peak power. Additional details related to the improved SNR that can be achieved using chirped-CPMG sequences are described the aforementioned publication titled "Chirped CPMG for well-logging NMR application" by Casabianca et al.

Still referring to FIG. 9, in some aspects, the chirped-CPMG sequences 1000 can generate echo signals 1010 that appear after each of the second refocusing pulses 1006. In some aspects, in addition to or in lieu of the echo signals 1008, the echo signals 1010 can be can be spatially encoded by applying a gradient field, detected by an RF coil assembly, and used for image construction (e.g. according to blocks 576, 577, and 578 of method 570 described with respect to FIG. 6). In some aspects, the echo signals 1008 can be characterized as free induction decay (FID) echo signals and the echo signals 1010 can be characterized as spectral echo signals.

Although FIGS. 9 and 9A show the chirped-CPMG sequences 1000, 1000a as having a series of refocusing pulses 1004, 1006 that includes two (2) first refocusing pulses 1004 and two (2) second refocusing pulses, the chirped-CPMG sequences 1000, 1000a can be modified to include any suitable number of first refocusing pulses 1004 and second refocusing pulses 1006, such as any number of first and second refocusing pulses 1004, 1006 that is a positive integer and that results in detectible echo signals 1008 and/or echo signals 1010. Further, persons of ordinary skill in the art will appreciate that the chirped-CPMG sequences 1000, 1000a can be repeated as desired.

As noted above, traditional T2-weighted imaging (T2w) sequences and diffusional-weighted imaging (DWI) sequences typically rely on a relatively long echo time TE and/or a relatively long repetition time TR to achieve the desired image contrast. Thus, applying T2w or DWI to a chirped-CPMG sequence, such as chirped-CPMG sequences 1000, 1000a (FIGS. 9, 9A), can result in poor SNRs and/or a long acquisition times. The chirped-CPMG sequences 1100, 1100a (FIGS. 10, 10a) and/or the preparation sequences 1114 (FIGS. 10, 10A), 1200 (FIG. 11), 1200a (FIG. 11A), 1300 (FIG. 12), 1300a (FIG. 12A) described herein can be implemented to support T2 weighted imaging and/or diffusional weighting imaging. In some aspects, the chirped-CPMG sequences 1100, 1100a (FIGS. 10, 10A) and/or the preparation sequences 1114 (FIGS. 10, 10A), 1200 (FIG. 11), 1200a (FIG. 11A), 1300 (FIG. 12), 1300a (FIG. 12A) can be implemented to achieve shorter TRs and/or improved SNRs compared to the chirped-CPMG sequences 1000, 1000a (FIGS. 9, 9A).

FIG. 10 is a pulse sequence diagram illustrating a chirped-CPMG sequence 1100, according to at least one non-limiting aspect of the present disclosure. The chirped-CPMG sequence 1100 includes an excitation pulse 1102, a series of refocusing pulses 1104, 1106 (e.g., first refocusing pulses 1104 and second refocusing pulses 1106), and one or more echo signals 1108. In some aspects, the chirped-CPMG sequence 1100 can include one or more echo signals 1110. The chirped-CPMG sequence 1100 can be similar to the chirped-CPMG sequences 1000, 1000a described above with respect to FIGS. 9 and 9A. For example, the excitation pulse 1102 (FIG. 10) can be similar to the excitation pulse 1002 (FIG. 9), the series of refocusing pulses 1104, 1106 (FIG. 10) can be similar to the series of refocusing pulses 1004, 1006 (FIG. 11), the echo signals 1108 (FIG. 10) can be similar to the echo signals 1008 (FIG. 9), and/or the echo signals 1110 (FIG. 10) can be similar to the echo signals 1010 (FIG. 9). Various details disclosed above related to the chirped-CPMG sequences 1000, 1000a of FIGS. 9 and 9A can similarly apply to the chirped-CPMG sequence 1100 of FIG. 10. The various MRI systems described herein can be configured to implement the chirped-CPMG sequence 1100. For example, referring to FIGS. 6 and 10, the chirped-CPMG sequence 1100 can be a pulse sequence 566 stored in the database 562 of the MRI system 500. The RF transmit/receive coils 550 can be configured to generate the pulses of the chirped-CPMG sequence 1100 and/or detect the echo signals of the chirped-CPMG sequence 1100.

Referring to FIG. 10, the chirped-CPMG sequence 1100 includes a recovery pulse 1112. The recovery pulse 1112 can be a 90° pulse that follows the series of refocusing pulses 1104, 1106. In some aspects, the recovery pulse 1112 can flip transverse magnetism induced by the excitation pulse 1102 and the series of refocusing pulses 1104, 1106 back to the longitudinal axis (e.g., such that the spins are again in alignment with main magnetic field $B_0$). Accordingly, the recovery pulse 1112 can effectively reduce TR compared to the chirped-CPMG sequence 1000 (FIG. 9). Thus, by including the recovery pulse 1112 following the series of refocusing pulses 1104, 1106, total acquisition times associated with the chirped-CPMG sequence 1100 (FIG. 10) may generally be lower than those associated with the chirped-CPMG sequence 1000 (FIG. 9).

Referring to FIG. 10, the recovery pulse 1112 can have a fourth phase $\phi_4$. As noted above with respect to FIG. 9 (describing the excitation pulse 1002 and refocusing pulses 1004, 1006), the excitation pulse 1102 can have a first phase $\phi_1$, each of the first refocusing pulses 1104 can have a second phase $\phi_2$, and each of the each of the second refocusing pulses 1106 can have a third phase $\phi_3$. The second phase $\phi_2$ can be shifted 90° (e.g., +/−90°) with respect to the first phase $\phi_1$, the third phase $\phi_3$ can be shifted 90° (e.g., +/−90°) with respect to the second phase $\phi_2$. The fourth phase $\phi_4$ of the of the recovery pulse 1112 can be shifted 180° (e.g., +/−180°) with respect to the first phase $\phi_1$. Thus, the excitation pulse 1002 can cause spins to flip from alignment with the longitudinal plane (e.g., in the z direction) to the transverse plane (e.g., along the xy plane) and the refocusing pulses 1104, 1106 can invert the spins 180° about the transverse plane to generate spin echoes. Further, the recovery pulse 1112 can cause spins to flip from alignment with the transverse plane back to the longitudinal plane, thereby effectively reducing TR.

FIG. 10A is a pulse sequence diagram illustrating a chirped-CPMG sequence 1100a. The chirped-CPMG sequence 1100a provides an example implementation of the chirped-CPMG sequence 1100 of FIG. 10. As shown in FIG. 10A, the excitation pulse 1102a has a first phase $\phi_1$ oriented in the +y direction along the transverse axis, the first refocusing pulses 1104a have a second phase $\phi_2$ oriented in the +x direction along the transverse axis (shifted 90° with respect to the first phase $\phi_1$), each of the second refocusing pulses 1106 have a third phase $\phi_3$ oriented in the +y direction along the transverse axis (shifted 90° with respect to the second phase $\phi_2$), and the recovery pulse 112a has a fourth phase $\phi_4$ oriented in the −y direction (shifted 90° with respect to the first phase $\phi_1$).

Referring again to FIG. 10, the recovery pulse 1112 can be frequency swept across a frequency range, such as the same frequency range as that of the excitation pulse 1102 and the refocusing pulses 1104, 1106. For example, the excitation pulse 1102, the refocusing pulses 1104, 1106, and the recovery pulse 1112 can each be frequency swept across a frequency offset range that is symmetric about a target resonance frequency, the frequency offset range having an initial frequency offset $O_i$ and a final frequency offset $O_f$. The recovery pulse 1112 can have a recovery pulse duration $T_{rec}$. The recovery pulse 1112 can be frequency swept at constant recovery sweep rate $R_{rec}$ from the initial frequency offset $O_i$ to the final frequency offset $O_f$ over the recovery pulse duration $T_{rec}$. In some aspects, the recovery sweep rate $R_{rec}$ can be equal to excitation sweep rate $R_{exe}$ and the recovery pulse duration $T_{rec}$ can be equal to the excitation pulse duration $T_{exe}$. For example, the chirped-CPMG sequence 1100a of FIG. 10A illustrates an example implementation of the chirped-CPMG sequence 1100 of FIG. 10 where the recovery pulse 1112a has a recovery pulse duration $T_{rec}$ equal to $T_{exe}$.

Although FIGS. 10 and 10A show the chirped-CPMG sequences 1100, 1100a as having a series of refocusing pulses 1104, 1106 that includes two (2) first refocusing pulses 1104 and two (2) second refocusing pulses 1106, the chirped-CPMG sequences 1100, 1100a can be modified to include any suitable number of first refocusing pulses 1104 and second refocusing pulses 1106, such as any number of first and second refocusing pulses 1104, 1106 that is a positive integer and that results in detectible echo signals 1108 and/or echo signals 1110. The recovery pulse 1112 can be implemented after a series of refocusing pulses 1104, 1106 with any suitable number of first refocusing pulses 1104 and second refocusing pulses 1106. Further, persons of ordinary skill in the art will appreciate that the chirped-CPMG sequences 1100, 1100a can be repeated as desired.

Referring again to FIG. 10, in some aspects, a preparation sequence 1114 may be implemented prior to each chirped-CPMG sequence 1100. In various aspects, the preparation sequence 1114 can be configured to support T2w or DWI without needed to increase the total acquisition time of the primary chirped-CPMG sequence 1100. For example, the preparation sequence 1114 may be configured to achieve T2w or DWI with the chirped-CPMG sequence 1100 without configuring (e.g., increasing) the time interval between the excitation pulse 1102 and/or the refocusing pulses 1104, 1106 to generate a TE needed for T2w or DWI. The terms "primary pulse sequence" and "primary RF pulse sequence" are sometimes used herein to refer to a chirped-CPMG sequence that is implemented following a preparation sequence. The various MRI systems described herein can be configured to implement the preparation sequence 1114 and the chirped-CPMG sequence 1100. For example, referring to FIGS. 6 and 10, the preparation sequence 1114 and the chirped-CPMG sequence 1100 can be a pulse sequence 566 stored in the database 562 of the MRI system 500. The RF transmit/receive coils 550 can be configured to generate the pulses of the preparation sequence 1114 and the chirped-CPMG sequence 1100.

Figure 11:
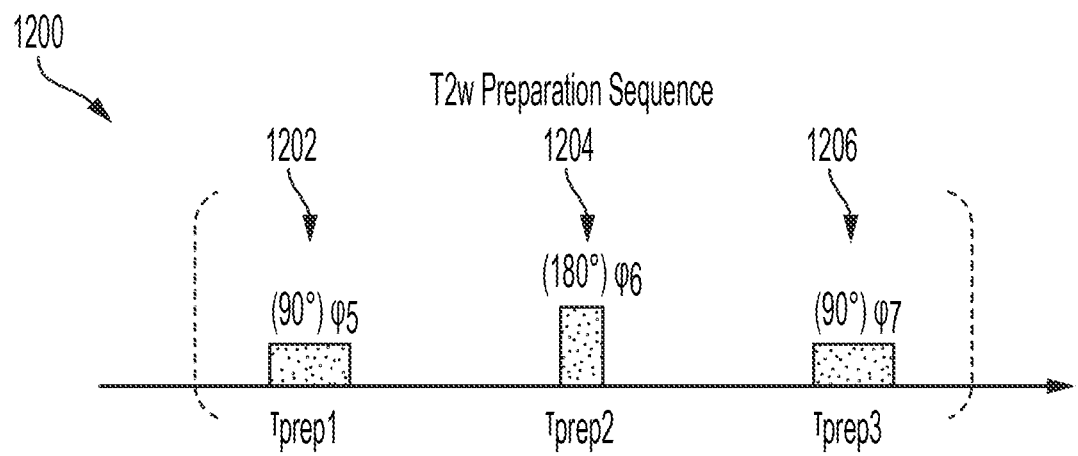
FIG. 11 depicts is a pulse sequence diagram illustrating a T2 weighted imaging (T2w) preparation sequence, in accordance with various aspects of the present disclosure.

FIG. 11 is a pulse sequence diagram illustrating a T2w preparation sequence 1200. The T2w preparation sequence 1200 is configured for T2 weighted imaging and may be implemented as the preparation sequence 1114 (FIG. 10). The T2w preparation sequence 1200 includes a first preparation pulse 1202, a second preparation pulse 1204, and a third preparation pulse 1206. The first preparation pulse 1202 is a 90° excitation pulse, the second preparation pulse 1204 is a 180° refocusing pulse, and the third preparation pulse 1206 is a 90° recovery pulse. The T2w preparation sequence 1200 can induce T2 weighted imaging while enabling a subsequent primary chirped-CPMG sequence (e.g., chirped-CPMG sequence 1000, chirped-CPMG sequence 1100) to maintain a relatively short interval between the 180° refocusing pulses and maintain the CMPG sequence condition, thereby reducing acquisition times compared to traditional T2 weighting methods. The T2w preparation sequence 1200 can generate T2 contrast by: (i) implementing the first preparation pulse 1202 to flip longitudinal magnetization onto the transverse plane; (ii) implementing the second preparation pulse 1204 at a first time interval after the first preparation pulse 1202 that is long enough to achieve T2 contrast (e.g., exp(−t/T2)), thereby generating a spin echo at a second time interval after the second preparation pulse 1204 that is equivalent to the first time interval between the first preparation pulse 1202 and the second preparation pulse 1204; and (3) implementing the third preparation pulse 1206 at the time of the generated spin echo to flip transverse magnetism back to the longitudinal plane.

For example, the first preparation pulse 1202 has a fifth phase $\phi_5$, the second preparation pulse 1204 has a sixth phase $\phi_6$, and the third preparation pulse 1206 has a seventh phase $\phi_7$. In some aspects, the fifth phase $\phi_5$ of the first preparation pulse 1202 can be shifted 90° (e.g., +/−90°) with respect to the first phase $\phi_1$ of the excitation pulse 1102 (FIG. 10), the sixth phase $\phi_6$ of the second preparation pulse 1204 can be shifted 90° (e.g., +/−90°) with respect to the fifth phase $\phi_5$, and the seventh phase $\phi_7$ of the third preparation pulse 1206 can be shifted 180° (e.g., +/−180°) with respect to the fifth phase $\phi_5$. Thus, the first preparation pulse 1202 can cause spins to flip from alignment with the longitudinal plane (e.g., in the z direction) to the transverse plane (e.g., along the xy plane), the second preparation pulse 1204 can flip the spins 180° about the transverse plane, and the third preparation pulse 1206 cause spins to flip from alignment with the transverse plane back to the longitudinal plane.

Figure 11A:
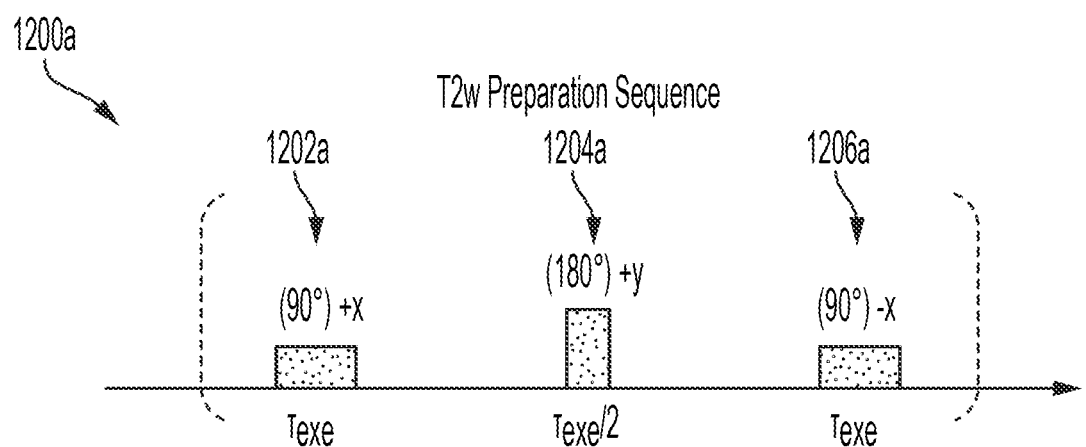
FIG. 11A depicts is a pulse sequence diagram illustrating an example implementation of the T2w preparation sequence of FIG. 11, in accordance with various aspects of the present disclosure.

FIG. 11A is a pulse sequence diagram illustrating T2w preparation sequence 1200a. The T2w preparation sequence 1200a provides an example implementation of the T2w preparation sequence 1200 of FIG. 11. As shown in FIG. 11A, the first preparation pulse 1202a has a fifth phase $\phi_5$ oriented in the +x direction along the transverse axis (shifted −90° with respect to the first phase $\phi_1$, +y, of the excitation pulse 1102a of FIG. 10A), the second preparation pulse 1204a has a sixth phase $\phi_5$ oriented in the +y direction along the transverse axis (shifted 90° with respect to the fifth phase $\phi_5$), and the third preparation pulse 1206a has a seventh phase $\phi_7$ oriented in the −x direction along the transverse axis (shifted 180° with respect to the fifth phase $\phi_5$).

Referring again to FIG. 11, each of the first preparation pulse 1202, the second preparation pulse 1204, and the third preparation pulse 1206 can be frequency swept across a frequency range, such as the same frequency range as that of the excitation pulse 1102 (FIG. 10) and the refocusing pulses 1104, 1106 (FIG. 10). For example, the first preparation pulse 1202, the second preparation pulse 1204, and the third preparation pulse 1206 can each be frequency swept across a frequency offset range that is symmetric about a target resonance frequency, the frequency offset range having an initial frequency offset $O_i$ and a final frequency offset $O_f$. The first preparation pulse 1202 can have a first preparation pulse duration $T_{prep1}$, the second preparation pulse 1204 can have a second preparation pulse duration $T_{prep2}$, and the third preparation pulse 1206 can have a third preparation pulse duration $T_{prep3}$. The first preparation pulse 1202 can be frequency swept at constant first preparation pulse sweep rate $R_{prep1}$ from the initial frequency offset $O_i$ to the final frequency offset $O_f$ over the first preparation pulse duration $T_{prep1}$. The second preparation pulse 1204 can be frequency swept at constant second preparation pulse sweep rate $R_{prep2}$ from the initial frequency offset $O_i$ to the final frequency offset $O_f$ over the second preparation pulse duration $T_{prep2}$. The third preparation pulse 1206 can be frequency swept at constant third preparation pulse sweep rate $R_{prep3}$ from the initial frequency offset $O_i$ to the final frequency offset $O_f$ over the third preparation pulse duration $T_{prep3}$.

In some aspects, first preparation pulse sweep rate $R_{prep1}$ and the third preparation pulse sweep rate $R_{prep3}$ can be equal to the excitation sweep rate $R_{exe}$ (FIG. 10), and first preparation pulse duration $T_{prep1}$ and the third preparation pulse duration $T_{prep3}$ can be equal to the excitation pulse duration $T_{exe}$ (FIG. 10). Further, the second preparation pulse sweep rate $R_{prep2}$ be twice to the excitation sweep rate $R_{exe}$ (FIG. 10), and second preparation pulse duration $T_{prep2}$ can be half the excitation pulse duration $T_{exe}$ (FIG. 10). For example, the T2w preparation sequence 1200a of FIG. 11A illustrates an example implementation of the T2w preparation sequence 1200 of FIG. 11 where first preparation pulse 1202a and the third preparation pulse 1206a respectively have a first preparation pulse duration $T_{prep1}$ and a third preparation pulse duration $T_{prep3}$ each equal to the excitation pulse duration $T_{exe}$ (FIG. 10). Further, the T2w preparation sequence 1200a shows the second preparation pulse 1204a having a second preparation pulse duration $T_{prep2}$ that is half excitation pulse duration ($T_{exe}/2$).

Figure 12:
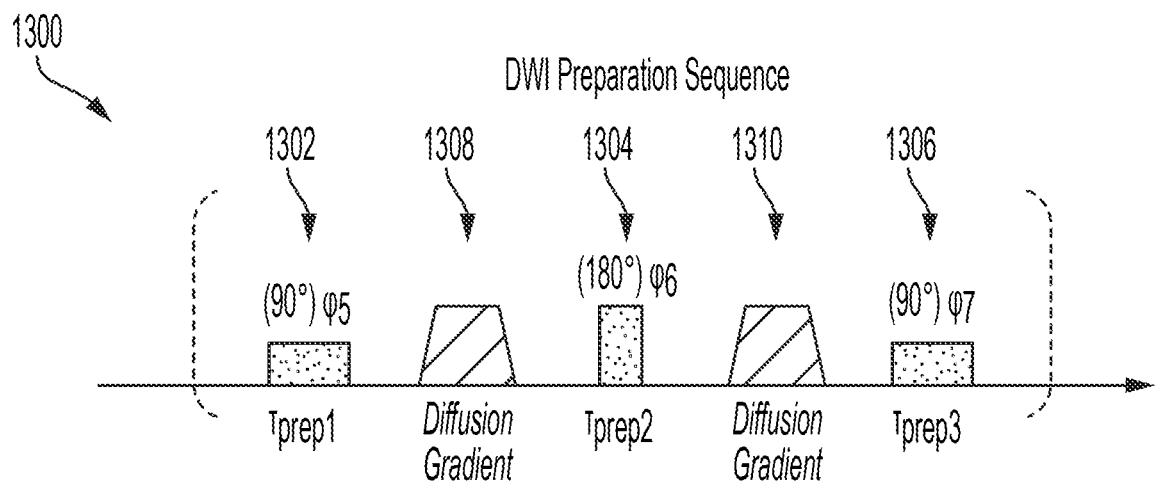
FIG. 12 depicts is a pulse sequence diagram illustrating a diffusion weighted imaging (DWI) preparation sequence, in accordance with various aspects of the present disclosure.

FIG. 12 is a pulse sequence diagram illustrating a DWI preparation sequence 1300. The DWI preparation sequence 1300 is configured for diffusion weighted imaging and may be implemented as the preparation sequence 1114 (FIG. 10). The DWI preparation sequence 1300 includes a first preparation pulse 1302, a second preparation pulse 1304, and a third preparation pulse 1306. The first preparation pulse 1302 is a 90° excitation pulse, the second preparation pulse 1304 is a 180° refocusing pulse, and the third preparation pulse 1306 is a 90° recovery pulse. The DWI preparation sequence 1300 further includes a first diffusion gradient 1308 and a second diffusion gradient 1310. The first diffusion gradient 1308 is applied after the first preparation pulse 1302 and before the second preparation pulse 1304. The second diffusion gradient 1310 is applied after the second preparation pulse 1304 and before the third preparation pulse 1306. Those of ordinary skill in the art will appreciate that the strength, duration, and time interval of the first diffusion gradient 1308 and the second diffusion gradient 1310 can be selected to achieve a desired b-value for diffusion weighting.

The first preparation pulse 1302, the second preparation pulse 1304, and the third preparation pulse 1306 of the DWI preparation sequence 1300 (FIG. 12) can be similar to the first preparation pulse 1202, the second preparation pulse 1204, and the third preparation pulse 1206 of the T2w preparation sequence 1200 described above with respect to FIG. 11. Various details (e.g., pulse duration, frequency sweeping, frequency sweep rate, phase) disclosed above related to the first preparation pulse 1202, the second preparation pulse 1204, and the third preparation pulse 1206 of the T2w preparation sequence 1200 (FIG. 11) can similarly apply to first preparation pulse 1302, the second preparation pulse 1304, and the third preparation pulse 1306 (FIG. 12). Thus, the DWI preparation sequence 1300 can induce diffusion weighted imaging while enabling a subsequent primary chirped-CPMG sequence (e.g., chirped-CPMG sequence 1000, chirped-CPMG sequence 1100) to maintain a relatively short interval between the 180° refocusing pulses and maintain the CMPG sequence condition, thereby reducing acquisition times compared to traditional diffusion weighting methods.

Figure 12A:
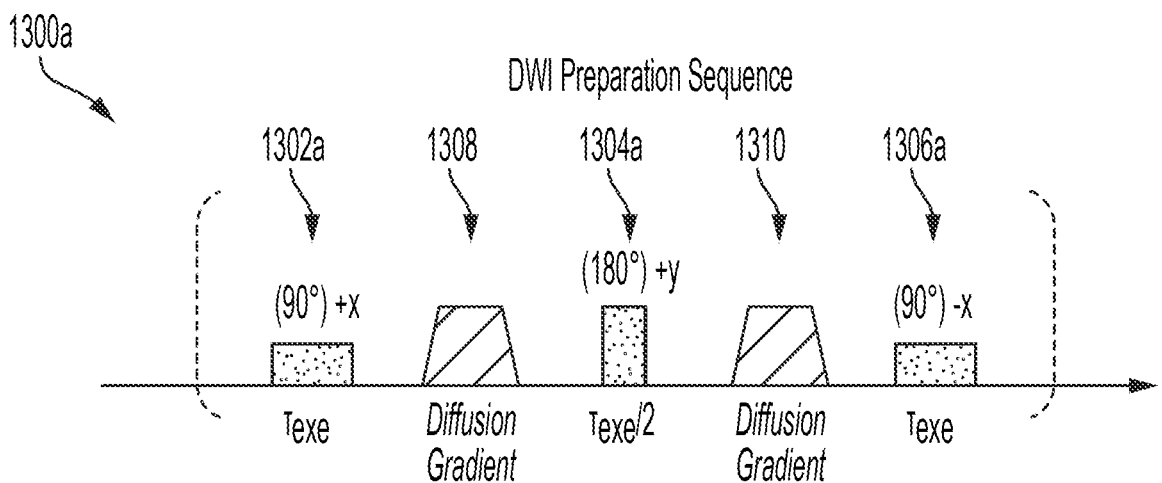
FIG. 12A depicts is a pulse sequence diagram illustrating an example implementation of the DWI preparation sequence of FIG. 12, in accordance with various aspects of the present disclosure.

FIG. 12A is a pulse sequence diagram illustrating a DWI preparation sequence 1300a. The DWI preparation sequence 1300a provides an example implementation of the DWI preparation sequence 1300 of FIG. 21. As shown in FIG. 12A, the first preparation pulse 1302a has a fifth phase $\phi_5$ oriented in the +x direction along the transverse axis (shifted −90° with respect to the first phase $\phi_1$, +y, of the excitation pulse 1102a of FIG. 10A), the second preparation pulse 1304a has a sixth phase $\phi_5$ oriented in the +y direction along the transverse axis (shifted 90° with respect to the fifth phase $\phi_5$), and the third preparation pulse 1306 has a seventh phase $\phi_7$ oriented in the −x direction along the transverse axis (shifted 180° with respect to the fifth phase $\phi_5$). Further, the first preparation pulse 1302a and the third preparation pulse 1306a respectively have a first preparation pulse duration $T_{prep1}$ and a third preparation pulse duration $T_{prep3}$ each equal to the excitation pulse duration $T_{exe}$ (FIG. 10). The second preparation pulse 1304a has a second preparation pulse duration $T_{prep2}$ that is half excitation pulse duration ($T_{exe}/2$).

The various MRI systems described herein can be configured to implement the DWI preparation sequence 1300. For example, referring to FIGS. 6 and 12, the first diffusion gradient 1308 and the second diffusion gradient 1310 can be generated by the gradient coils 504 of the MRI system 500. The first preparation pulse 1302, the second preparation pulse 1304, and the third preparation pulse 1306 can be generated by the RF transmit/receive coils 550 of the MRI system 500. The DWI preparation sequence 1300 can be a pulse sequence 566 stored in the database 562 of the MRI system 500, and may include an RF pulse sequence corresponding to the first preparation pulse 1302, the second preparation pulse 1304, and the third preparation pulse 1306; and a gradient sequence corresponding to the first diffusion gradient 1308 and the second diffusion gradient 1310.

Any of the pulse sequences described herein (chirped-CPMG sequence 1000 (FIG. 9), the chirped-CPMG sequence 1100 (FIG. 10), the preparation sequence 1114 (FIG. 10), the T2w preparation sequence 1200 (FIG. 11), the DWI preparation sequence 1300 (FIG. 12)) can include standard imaging, crusher, and/or spoiler gradients.

EXAMPLES

Various additional aspects of the subject matter described herein are set out in the following numbered clauses:

Clause 1: A method, comprising: projecting a magnetic field along a longitudinal axis and toward an object of interest located within a field of view; transmitting a radio frequency pulse sequence to a radio frequency coil assembly configured to selectively excite magnetization in the object of interest within the field of view, wherein the radio frequency pulse sequence comprises: an excitation pulse that is frequency swept across a frequency offset range; a series of refocusing pulses following the excitation pulse, wherein each of the refocusing pulses are frequency swept across the frequency offset range, and wherein each of the refocusing pulses are half the duration of the excitation pulse; and a recovery pulse following the series of refocusing pulses, wherein the recovery pulse is frequency swept across the frequency offset range; and receiving an output signal detected by the radio frequency coil assembly an intermediate two of the refocusing pulses.

Clause 2: The method of Clause 1, wherein the radio frequency pulse sequence is a primary radio frequency pulse sequence, wherein the method further comprises transmitting a preparation radio frequency pulse sequence to the radio frequency coil assembly prior to transmitting the primary radio frequency pulse sequence, and wherein the preparation radio frequency pulse sequence is configured to achieve T2 weighted imaging or diffusion weighted imaging.

Clause 3: The method of claim 2, further comprising sequentially repeating the transmission of the preparation radio frequency pulse sequence and the primary radio frequency pulse sequence.

Clause 4: The method of any of Clauses 1-3, wherein the excitation pulse is a 90° pulse, wherein each of the refocusing pulses are 180° pulses, and wherein the recovery pulse is a 90° pulse.

Clause 5: The method of any of Clauses 1-4, wherein the excitation pulse and the recovery pulse are frequency swept across the frequency offset range at a first rate, wherein the refocusing pulses are frequency swept across the frequency offset range at a second rate, and wherein the second rate is twice the first rate.

Clause 6: The method of any of Clauses 1-5, wherein the excitation pulse comprises a first phase $\phi1$, wherein the recovery pulse comprises a second phase $\phi2$, and wherein the second phase $\phi2$ equals the first phase $\phi1$ plus 180°.

Clause 7: The method of any of Clauses 1-6, wherein the series of refocusing pulses comprises sequentially repeating first and second refocusing pulses.

Clause 8: The method of Clause 7, wherein receiving an output signal detected by the radio frequency coil assembly intermediate two of the refocusing pulses comprises receiving multiple output signals from the radio frequency coil assembly, wherein each of the multiple output signals are detected intermediate one of the first refocusing pulses and one of the second refocusing pulses.

Clause 9: The method of Clause 8, wherein each of the multiple output signals is detected after one of the first refocusing pulses and prior to a corresponding one of the second refocusing pulses.

Clause 10: The method of any one of Clauses 7-9, wherein the first refocusing pulses comprise a third phase $\phi3$, wherein the second refocusing pulses comprise a fourth phase $\phi4$, wherein the third phase $\phi3$ equals the first phase $\phi1$ plus or minus 90°, and wherein the fourth phase $\phi4$ equals the third phase $\phi3$ plus or minus 90°.

Clause 11: The method of Clause 10, wherein the preparation radio frequency pulse sequence comprises: a first preparation pulse that is frequency swept across the frequency offset range at the first rate, wherein the first preparation pulse is a 90° pulse; a second preparation pulse that is frequency swept across the frequency offset range at the second rate, wherein the second preparation pulse is a 180° pulse; and a third preparation pulse that is frequency swept across the frequency offset range at the first rate, wherein the third preparation pulse is a 90° pulse.

Clause 12: The method of Clause 11, wherein the first preparation pulse comprises a fifth phase $\phi5$, wherein the second preparation pulse comprises a sixth phase $\phi6$, wherein the third preparation pulse comprises a seventh phase $\phi7$, wherein the fifth phase $\phi5$ equals the first phase $\phi1$ plus or minus 90°, wherein the sixth phase $\phi6$ equals the fifth phase $\phi5$ plus or minus 90°, and wherein the seventh phase $\phi7$ equals the fifth phase $\phi5$ plus 180°.

Clause 13: The method of any of claims 10-11, wherein the preparation radio frequency pulse sequence is configured for diffusion weighted imaging, the method further comprising: transmitting a gradient sequence to a gradient coil assembly configured to modify the magnetic field projected along the longitudinal axis, wherein the gradient sequence comprises: a first diffusion gradient after the first preparation pulse and prior to the second preparation pulse of the preparation radio frequency pulse sequence; a second diffusion gradient after the second preparation pulse and prior to the third preparation pulse of the preparation radio frequency pulse sequence.

Clause 14: The method of any of Clauses 1-13, wherein projecting a magnetic field along a longitudinal axis and toward an object of interest located within a field of view comprises projecting a low-field strength magnetic field.

Clause 15: A system, comprising: an array of magnets configured to generate a low-field strength magnetic field toward an object of interest located within a field of view; a radio frequency coil assembly configured to selectively excite magnetization in the object of interest in the field of view; a control circuit comprising a processor and a memory, wherein the memory stores instructions executable by the processor to: transmit a preparation radio frequency pulse sequence to the radio frequency coil assembly; and transmit a primary radio frequency pulse sequence to the radio frequency coil assembly, wherein the primary radio frequency pulse sequence comprises: an excitation pulse that is frequency swept across a frequency offset range at a first rate, wherein the excitation pulse is a 90° pulse; and a series of refocusing pulses following the excitation pulse, wherein each of the refocusing pulses are frequency swept across the frequency offset range at a second rate that is twice the first rate, and wherein each of the refocusing pulses are 180° pulses and are half the duration of the excitation pulse; and receive an output signal detected by the radio frequency coil assembly intermediate two of the refocusing pulses.

Clause 16: The system of Clause 15, wherein the preparation radio frequency pulse sequence comprises: a first preparation pulse that is frequency swept across the frequency offset range at the first rate, wherein the first preparation pulse is a 90° pulse and is the same duration as the excitation pulse; a second preparation pulse that is frequency swept across the frequency offset range at the second rate, wherein the second preparation pulse is a 180° pulse and is half the duration as the excitation pulse; and a third preparation pulse that is frequency swept across the frequency offset range at the first rate, wherein the third preparation pulse is a 90° pulse and is the same duration as the excitation pulse.

Clause 17: The system Clause 16, wherein the primary radio frequency pulse sequence further comprises a recovery pulse following the series of refocusing pulses, wherein the recovery pulse is frequency swept across the frequency offset range at the first rate, and wherein the recovery pulse is a 90° pulse and is the same duration as the excitation pulse.

Clause 18: The system Clause 17, wherein the excitation pulse comprises a first phase $\phi 1$, wherein the recovery pulse comprises a second phase $\phi 2$, and wherein the second phase $\phi 2$ equals the first phase $\phi 1$ plus 180°.

Clause 19: The system Clause 18, wherein the series of refocusing pulses comprises sequentially repeating a first refocusing pulse and a second refocusing pulse, wherein the memory stores instructions executable by the processor to receive multiple output signals from the radio frequency coil assembly, and wherein each of the multiple output signals is received intermediate one of the first refocusing pulses and one of the second refocusing pulses.

Clause 20: The system of Clause 19, wherein the first refocusing pulses comprise a third phase $\phi 3$, wherein the second refocusing pulses comprise a fourth phase $\phi 4$, wherein the first preparation pulse comprises a fifth phase $\phi 5$, wherein the second preparation pulse comprises a sixth phase $\phi 6$, wherein the third preparation pulse comprises a seventh phase $\phi 7$, wherein the third phase $\phi 3$ equals the first phase $\phi 1$ plus or minus 90°, wherein the fourth phase $\phi 4$ equals the third phase $\phi 3$ plus or minus 90°, wherein the fifth phase $\phi 5$ equals the first phase $\phi 1$ plus or minus 90°, wherein the sixth phase $\phi 6$ equals the fifth phase $\phi 5$ plus or minus 90°, and wherein the seventh phase $\phi 7$ equals the fifth phase $\phi 5$ plus 180°.

Clause 21: The system of Clause 20, further comprising: a gradient coil assembly configured to modify the low-field strength magnetic field projected along the longitudinal axis; wherein the memory stores instructions executable by the processor to transmit a gradient sequence to the gradient coil assembly, wherein the gradient sequence comprises: a first diffusion gradient after the first preparation pulse and prior to the second preparation pulse of the preparation radio frequency pulse sequence; a second diffusion gradient after the second preparation pulse and prior to the third preparation pulse of the preparation radio frequency pulse sequence.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a control circuit computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method, comprising:
projecting a magnetic field along a longitudinal axis and toward an object of interest located within a field of view;
transmitting a preparation radio frequency pulse sequence to a radio frequency coil assembly configured to selectively excite magnetization in the object of interest within the field of view, wherein the preparation radio frequency pulse sequence comprises:
a first preparation pulse that is frequency swept across the frequency offset range at the first rate, wherein the first preparation pulse is a 90° pulse;
a second preparation pulse that is frequency swept across the frequency offset range at the second rate, wherein the second preparation pulse is a 180° pulse; and a third preparation pulse that is frequency swept across the frequency offset range at the first rate, wherein the third preparation pulse is a 90° pulse:
transmitting a radio frequency pulse sequence to the radio frequency coil assembly, wherein the radio frequency pulse sequence comprises:
an excitation pulse that is frequency swept across a frequency offset range;
a series of refocusing pulses following the excitation pulse, wherein each of the refocusing pulses are frequency swept across the frequency offset range, and wherein each of the refocusing pulses are half the duration of the excitation pulse; and
a recovery pulse following the series of refocusing pulses, wherein the recovery pulse is frequency swept across the frequency offset range;
wherein the excitation pulse and the recovery pulse are frequency swept across the frequency offset range at a first rate, wherein the refocusing pulses are frequency swept across the frequency offset range at a second rate, and wherein the second rate is twice the first rate; and
receiving an output signal detected by the radio frequency coil assembly an intermediate two of the refocusing pulses.

2. The method of claim 1, wherein the radio frequency pulse sequence is a primary radio frequency pulse sequence, wherein the the preparation radio frequency pulse sequence to the radio frequency coil assembly prior to transmitting the primary radio frequency pulse sequence, and wherein the preparation radio frequency pulse sequence is configured to achieve T2 weighted imaging or diffusion weighted imaging.

3. The method of claim 2, further comprising sequentially repeating the transmission of the preparation radio frequency pulse sequence and the primary radio frequency pulse sequence.

4. The method of claim 3, wherein the excitation pulse is a 90° pulse, wherein each of the refocusing pulses are 180° pulses, and wherein the recovery pulse is a 90° pulse.

5. The method of claim 4, wherein the excitation pulse comprises a first phase $\phi_1$, wherein the recovery pulse comprises a second phase $\phi_2$, and wherein the second phase $\phi_2$ equals the first phase $\phi_1$ plus 180°.

6. The method of claim 5, wherein the series of refocusing pulses comprises sequentially repeating first and second refocusing pulses.

7. The method of claim 6, wherein receiving an output signal detected by the radio frequency coil assembly intermediate two of the refocusing pulses comprises receiving multiple output signals from the radio frequency coil assembly, wherein each of the multiple output signals are detected intermediate one of the first refocusing pulses and one of the second refocusing pulses.

8. The method of claim 7, wherein each of the multiple output signals is detected after one of the first refocusing pulses and prior to a corresponding one of the second refocusing pulses.

9. The method of claim 8, wherein the first refocusing pulses comprise a third phase $\phi_3$, wherein the second refocusing pulses comprise a fourth phase $\phi_4$, wherein the third phase $\phi3$ equals the first phase $\phi_1$ plus or minus 90°, and wherein the fourth phase $\phi_4$ equals the third phase $\phi_3$ plus or minus 90°.

10. The method of claim 9, wherein the first preparation pulse comprises a fifth phase $\phi_5$, wherein the second preparation pulse comprises a sixth phase $\phi_6$, wherein the third preparation pulse comprises a seventh phase $\phi_7$, wherein the fifth phase $\phi_5$ equals the first phase $\phi_1$ plus or minus 90°, wherein the sixth phase $\phi_6$ equals the fifth phase $\phi_5$ plus or minus 90°, and wherein the seventh phase $\phi_7$ equals the fifth phase $\phi_5$ plus 180°.

11. The method of claim 9, wherein the preparation radio frequency pulse sequence is configured for diffusion weighted imaging, the method further comprising:
transmitting a gradient sequence to a gradient coil assembly configured to modify the magnetic field projected along the longitudinal axis, wherein the gradient sequence comprises:
a first diffusion gradient after the first preparation pulse and prior to the second preparation pulse of the preparation radio frequency pulse sequence;
a second diffusion gradient after the second preparation pulse and prior to the third preparation pulse of the preparation radio frequency pulse sequence.

12. The method of claim 2, wherein projecting a magnetic field along a longitudinal axis and toward an object of interest located within a field of view comprises projecting a low-field strength magnetic field.

13. A system, comprising:
an array of magnets configured to generate a low-field strength magnetic field toward an object of interest located within a field of view;
a radio frequency coil assembly configured to selectively excite magnetization in the object of interest in the field of view;
a control circuit comprising a processor and a memory, wherein the memory stores instructions executable by the processor to:
transmit a preparation radio frequency pulse sequence to the radio frequency coil assembly, wherein the preparation radio frequency pulse sequence comprises:
a first preparation pulse that is frequency swept across the frequency offset range at the first rate, wherein the first preparation pulse is a 90 pulse and is the same duration as the excitation pulse;
a second preparation pulse that is frequency swept across the frequency offset range at the second rate, wherein the second preparation pulse is a 1800 pulse and is half the duration as the excitation pulse; and
a third preparation pulse that is frequency swept across the frequency offset range at the first rate, wherein the third preparation pulse is a 90° pulse and is the same duration as the excitation pulse; and
transmit a primary radio frequency pulse sequence to the radio frequency coil assembly, wherein the primary radio frequency pulse sequence comprises:
an excitation pulse that is frequency swept across a frequency offset range at a first rate, wherein the excitation pulse is a 90° pulse; and
a series of refocusing pulses following the excitation pulse, wherein each of the refocusing pulses are frequency swept across the frequency offset range at a second rate that is twice the first rate, and wherein each of the refocusing pulses are 180° pulses and are half the duration of the excitation pulse; and
receive an output signal detected by the radio frequency coil assembly intermediate two of the refocusing pulses.

14. The system of claim 13, wherein the primary radio frequency pulse sequence further comprises a recovery pulse following the series of refocusing pulses, wherein the recovery pulse is frequency swept across the frequency offset range at the first rate, and wherein the recovery pulse is a 90° pulse and is the same duration as the excitation pulse.

15. The system of claim 14, wherein the excitation pulse comprises a first phase $\phi_1$, wherein the recovery pulse comprises a second phase $\phi_2$, and wherein the second phase $\phi_2$ equals the first phase $\phi_1$ plus 180°.

16. The system of claim 15, wherein the series of refocusing pulses comprises sequentially repeating a first refocusing pulse and a second refocusing pulse, wherein the memory stores instructions executable by the processor to receive multiple output signals from the radio frequency coil assembly, and wherein each of the multiple output signals is received intermediate one of the first refocusing pulses and one of the second refocusing pulses.

17. The system of claim 16, wherein the first refocusing pulses comprise a third phase $\phi_3$, wherein the second refocusing pulses comprise a fourth phase $\phi_4$, wherein the first preparation pulse comprises a fifth phase $\phi_5$, wherein the second preparation pulse comprises a sixth phase $\phi_6$, wherein the third preparation pulse comprises a seventh phase $\phi_7$, wherein the third phase $\phi_3$ equals the first phase $\phi_2$ plus or minus 90°, wherein the fourth phase $\phi_4$ equals the third phase $\phi_3$ plus or minus 90°, wherein the fifth phase $\phi_5$ equals the first phase $\phi_1$ plus or minus 90°, wherein the sixth phase $\phi_6$ equals the fifth phase $\phi_5$ plus or minus 90°, and wherein the seventh phase $\phi_7$ equals the fifth phase $\phi_5$ plus 180°.

18. The system of claim 17, further comprising:
a gradient coil assembly configured to modify the low-field strength magnetic field generated by the array of magnets;
wherein the memory stores instructions executable by the processor to transmit a gradient sequence to the gradient coil assembly, wherein the gradient sequence comprises:
a first diffusion gradient after the first preparation pulse and prior to the second preparation pulse of the preparation radio frequency pulse sequence;
a second diffusion gradient after the second preparation pulse and prior to the third preparation pulse of the preparation radio frequency pulse sequence.

* * * * *